United States Patent
Tsukida et al.

(10) Patent No.: US 9,947,471 B2
(45) Date of Patent: *Apr. 17, 2018

(54) MULTILAYER CAPACITOR AND METHOD FOR PRODUCING THE SAME

(71) Applicant: Murata Manufacturing Co., Ltd., Nagaokakyo-shi, Kyoto-fu (JP)

(72) Inventors: Masaki Tsukida, Nagaokakyo (JP); Hiroshi Masai, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 130 days.

This patent is subject to a terminal disclaimer.

(21) Appl. No.: 15/014,164

(22) Filed: Feb. 3, 2016

(65) Prior Publication Data

US 2016/0247632 A1 Aug. 25, 2016

(30) Foreign Application Priority Data

Feb. 19, 2015 (JP) ................... 2015-030435

(51) Int. Cl.
  *H01G 4/232* (2006.01)
  *H01G 4/30* (2006.01)
  *H01G 4/005* (2006.01)

(52) U.S. Cl.
  CPC ............. *H01G 4/232* (2013.01); *H01G 4/005* (2013.01); *H01G 4/30* (2013.01)

(58) Field of Classification Search
  None
  See application file for complete search history.

(56) References Cited

U.S. PATENT DOCUMENTS

2011/0157766 A1* 6/2011 Cho .................. H01G 4/005
                                                                361/303
2012/0307417 A1* 12/2012 Kim .................. H01G 4/30
                                                                361/321.2
(Continued)

FOREIGN PATENT DOCUMENTS

JP          05-299289 A          11/1993
JP          2010-103566 A        5/2010
(Continued)

OTHER PUBLICATIONS

Official Communication issued in corresponding Korean Patent Application No. 10-2016-0019631, dated Jun. 16, 2017.

*Primary Examiner* — Dion R Ferguson
(74) *Attorney, Agent, or Firm* — Keating & Bennett, LLP

(57) ABSTRACT

A multilayer capacitor includes a multilayer body with sides each about 0.3 mm or smaller when viewed from a stacking direction of the multilayer body, and first and second outer electrodes disposed on a surface of the multilayer body. An outermost one of the conductive layers is bent to be convex in the stacking direction and includes penetrating portions extending in the stacking direction. In a cross section perpendicular or substantially perpendicular to a lengthwise direction of the multilayer body, assuming the bent conductive layer is equally divided into four regions named region A, region B, region C, and region D arranged in the order named in a widthwise direction of the multilayer body, a sum of minimum diameters of the penetrating portions is larger in the region A than in the region B and larger in the region D than in the region C.

21 Claims, 22 Drawing Sheets

(56) References Cited

U.S. PATENT DOCUMENTS

| | | | |
|---|---|---|---|
| 2013/0002388 A1* | 1/2013 | Kim | H01G 4/30 336/200 |
| 2013/0107417 A1 | 5/2013 | Cho et al. | |
| 2015/0116896 A1* | 4/2015 | Inazuka | H01G 4/1227 361/301.4 |
| 2015/0116898 A1* | 4/2015 | Takashima | H01G 4/012 361/301.4 |
| 2016/0155569 A1* | 6/2016 | Tsukida | H01G 4/012 361/301.4 |

FOREIGN PATENT DOCUMENTS

| | | |
|---|---|---|
| JP | 2013-098538 A | 5/2013 |
| JP | 2015-026841 A | 2/2015 |
| JP | 2015-029152 A | 2/2015 |
| KR | 10-2015-0010680 A | 1/2015 |

* cited by examiner

MULTILAYER CAPACITOR AND METHOD FOR PRODUCING THE SAME

BACKGROUND OF THE INVENTION

1. Field of the Invention

The present invention relates to a multilayer capacitor and a method for producing the multilayer capacitor. In particular, the present invention relates to an ultra-small multilayer capacitor and a method for producing the ultra-small multilayer capacitor.

2. Description of the Related Art

In general, a multilayer capacitor is constituted by a multilayer body made up of conductive layers and dielectric layers arranged in an alternating manner; and outer electrodes disposed on the outside surface of the multilayer body. With electronic devices becoming smaller and thinner, there is a need for a small-sized multilayer capacitor with large electrostatic capacitance. General ways to increase the capacitance of the multilayer capacitor is to increase the area of overlap between adjacent conductive layers and increase the number of conductive layers.

In the case where the multilayer capacitor is reduced in size and the capacitance thereof is increased in the general ways described above, the distance from the conductive layers to the surface of the multilayer body becomes small. In general, the outer electrodes are likely to become thinner at the corners of the multilayer body. Because of these, conductive layers near the corners of the multilayer body become susceptible to moisture coming in through the outer electrodes, and the insulation resistance of the multilayer capacitor decreases. That is, the moisture resistance of the multilayer capacitor decreases.

Japanese Unexamined Patent Application Publication No. 2010-103566 discloses a highly moisture-resistant small multilayer capacitor. The multilayer capacitor disclosed in this document has a high moisture resistance because the concentration of magnesium is high in a dielectric disposed between conductive layers and the side surfaces of the multilayer body.

Increasing the number of conductive layers leads to an increase in internal stress, which results from the difference in thermal shrinkage between dielectric layers and conductive layers when the multilayer capacitor is fired. This makes the multilayer capacitor prone to layer separation.

SUMMARY OF THE INVENTION

Accordingly, preferred embodiments of the present invention provide a small-sized, large-capacitance multilayer capacitor that is highly moisture-resistant and less prone to layer separation.

According to a preferred embodiment of the present invention, a method for producing a multilayer capacitor including a multilayer body that includes conductive layers and dielectric layers arranged on top of each other in an alternating manner and that has external dimensions in which each side is about 0.3 mm or smaller when viewed from a stacking direction of the multilayer body, and first and second outer electrodes disposed on a surface of the multilayer body, includes the steps of: a) forming the multilayer body by stacking the conductive layers and the dielectric layers alternately, each of the conductive layers being located in a first arrangement or a second arrangement such that the conductive layers are located in the first arrangement and the second arrangement different from the first arrangement when viewed from the stacking direction; b) stretching the conductive layers in directions perpendicular or substantially perpendicular to the stacking direction by pressing the multilayer body; c) bending at least one of the conductive layers by pressing the multilayer body so that the at least one of the conductive layers is convex in the stacking direction; and d) forming the first and second outer electrodes on the surface of the multilayer body so that the first outer electrode is connected to those ones of the conductive layers which are in the first arrangement and the second outer electrode is connected to those ones of the conductive layers which are in the second arrangement.

The method may be performed such that each of the conductive layers is tapered in thickness from a center to an edge.

The method may be performed such that each of the conductive layers contains at least one of barium titanate and silicon.

The method may be performed such that step a) includes placing at least one pair of the conductive layers, which are adjacent to each other with one of the dielectric layers interposed therebetween, both in the first arrangement or both in the second arrangement.

The method may be performed such that the at least one pair of the conductive layers includes at least one of two of the conductive layers which are located outermost in the stacking direction.

According to another preferred embodiment of the present invention, a multilayer capacitor includes a multilayer body including conductive layers and dielectric layers arranged on each other in an alternating manner and that has external dimensions in which each side is about 0.3 mm or smaller when viewed from a stacking direction of the multilayer body; and first and second outer electrodes that are disposed on a surface of the multilayer body and that are spaced apart from each other in a lengthwise direction of the multilayer body. The multilayer body is structured such that the conductive layers and the dielectric layers are arranged on each other in the alternating manner, each of the conductive layers being disposed in a first arrangement or a second arrangement such that the conductive layers are located in the first arrangement and second arrangement different from the first arrangement when viewed from the stacking direction. The first outer electrode is connected to those ones of the conductive layers which are in the first arrangement. The second outer electrode is connected to those ones of the conductive layers which are in the second arrangement. At least one of the conductive layers which is located outermost in the stacking direction is bent so as to be convex in the stacking direction and includes penetrating portions which extend in the stacking direction. Assume that, in a cross section perpendicular or substantially perpendicular to the lengthwise direction, the bent conductive layer is equally divided into four regions named region A, region B, region C, and region D which are arranged in the order named in a widthwise direction of the multilayer body. The angle of inclination of the bent conductive layer is larger in the region A than in the region B and larger in the region D than in the region C, and the sum of the minimum diameters of the penetrating portions is larger in the region A than in the region B and larger in the region D than in the region C.

The multilayer capacitor may have a structure such that each of the conductive layers is not more than about 80% of the multilayer body in width and the maximum difference in width between the multilayer body and each of the conductive layers is less than about 0.07 mm, for example. It should be noted here that the width means the size in the widthwise direction of each body or layer.

The multilayer capacitor may have a structure such that at least one of the dielectric layers is an ineffective dielectric layer sandwiched between two of the conductive layers which are both in the first arrangement or both in the second arrangement and at least one of the dielectric layers is an effective dielectric layer sandwiched between two of the conductive layers which are in the first and second arrangements, respectively.

The multilayer capacitor may have a structure such that the ineffective dielectric layer adjoins at least one of two of the conductive layers which are outermost in the stacking direction.

The multilayer capacitor may have a structure such that the amount of convexity of the bent conductive layer in the cross section perpendicular or substantially perpendicular to the lengthwise direction is larger than the thickness of one of the dielectric layers which adjoins the bent conductive layer.

The multilayer capacitor may have a structure such that at least one of the penetrating portions contains filler in each of the regions A and D.

The multilayer capacitor may have a structure such that the filler contains a dielectric material which constitutes the dielectric layers.

The multilayer capacitor may have a structure such that the filler contains silicon.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
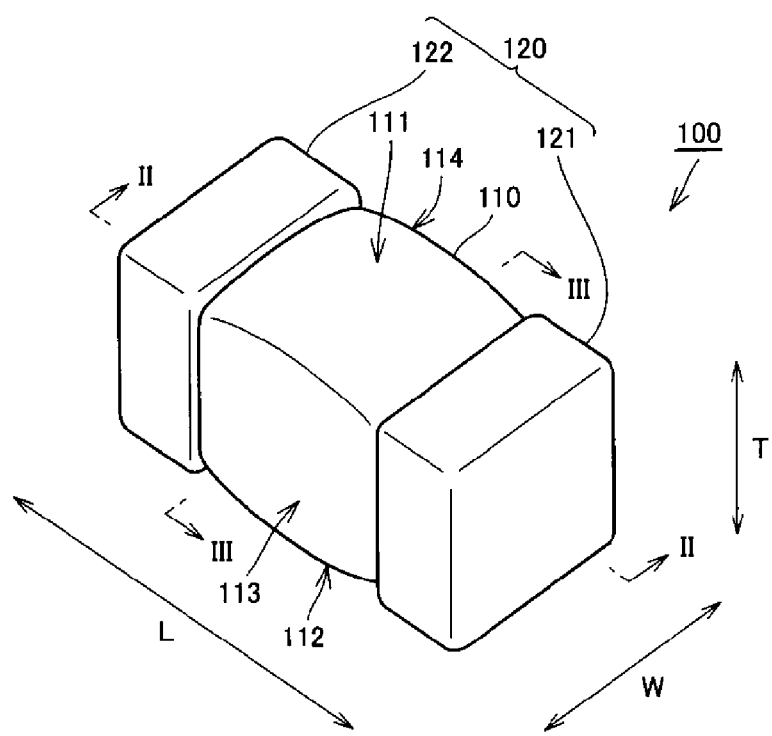
FIG. 1 is a perspective view showing the appearance of a multilayer capacitor of Preferred Embodiment 1 of the present invention.

The following describes multilayer capacitors and methods for producing the multilayer capacitors in accordance with preferred embodiments of the present invention with reference to the drawings. In the following description, the same or corresponding members in the drawings are assigned identical reference numbers and the descriptions for them are not repeated.

Preferred Embodiment 1

Figure 2:
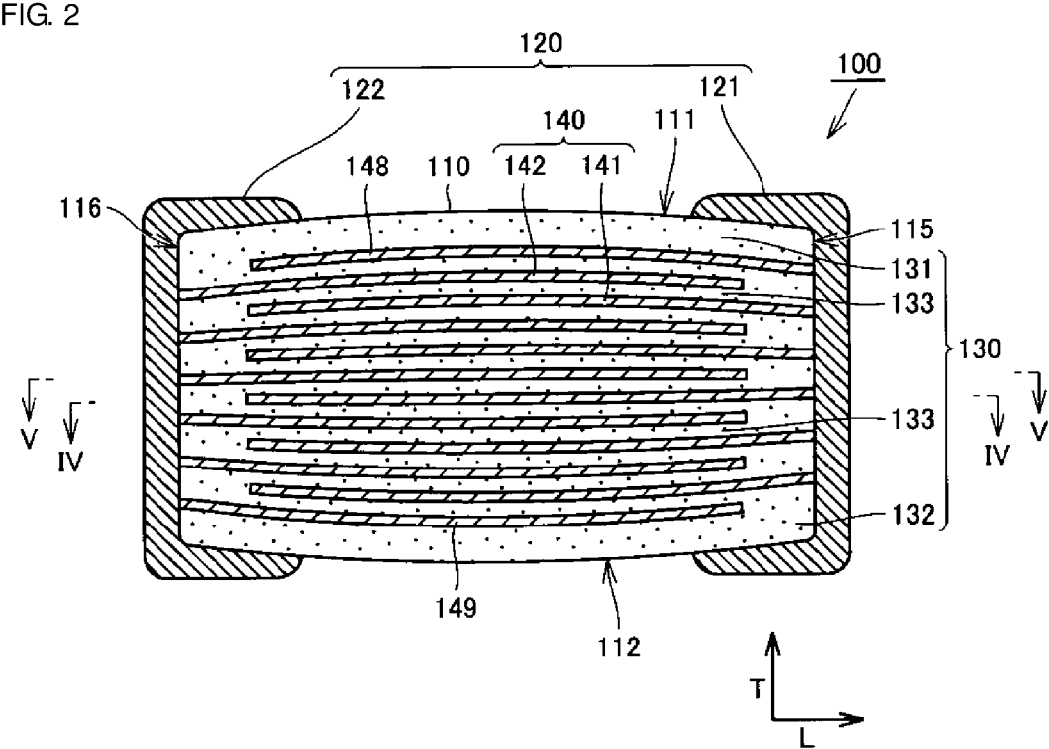
FIG. 2 is a cross-sectional view of the multilayer capacitor of FIG. 1 taken along line II-II.
Figure 3:
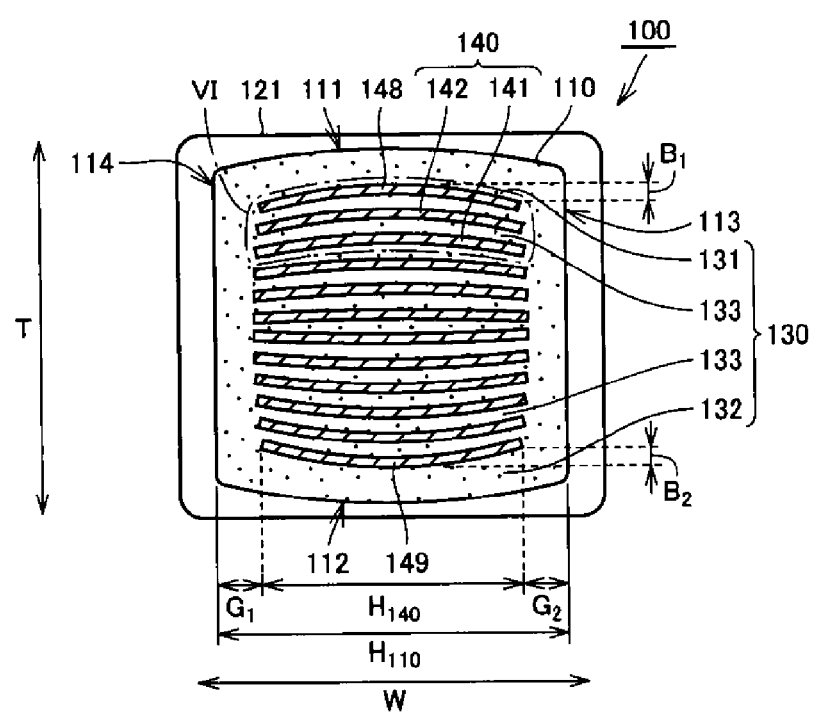
FIG. 3 is a cross-sectional view of the multilayer capacitor of FIG. 1 taken along line III-III.
Figure 4:
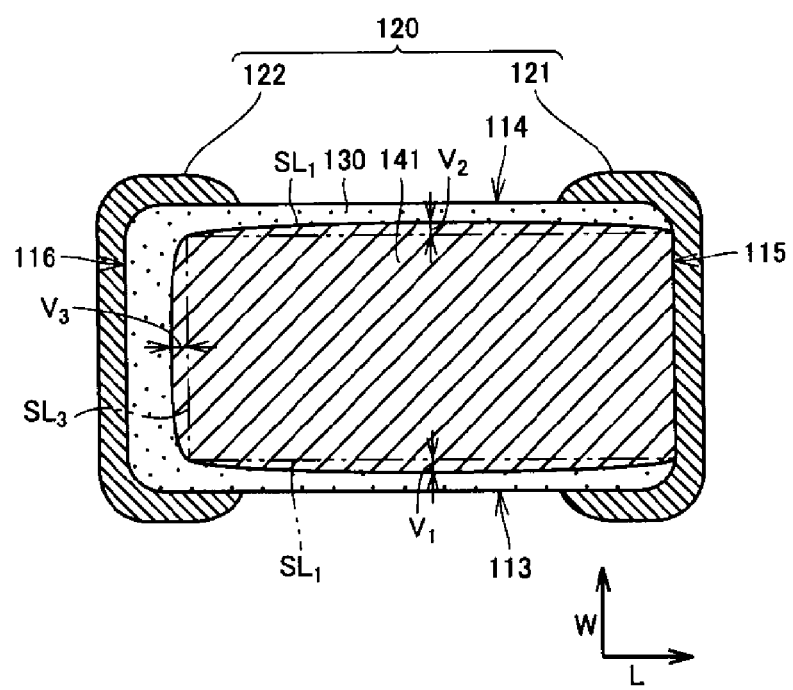
FIG. 4 is a cross-sectional view of the multilayer capacitor of FIG. 2 taken along line IV-IV.
Figure 5:
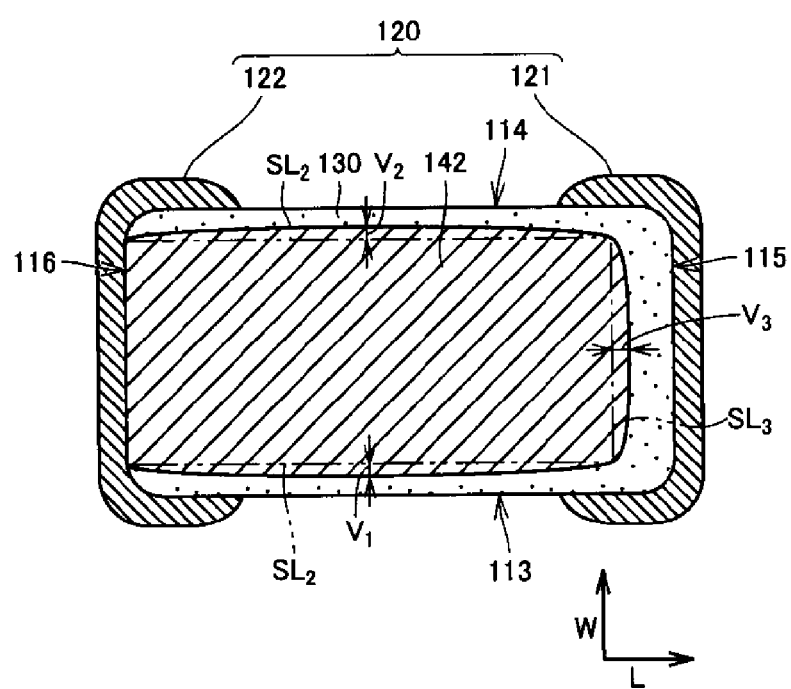
FIG. 5 is a cross-sectional view of the multilayer capacitor of FIG. 2 taken along line V-V.
Figure 6:
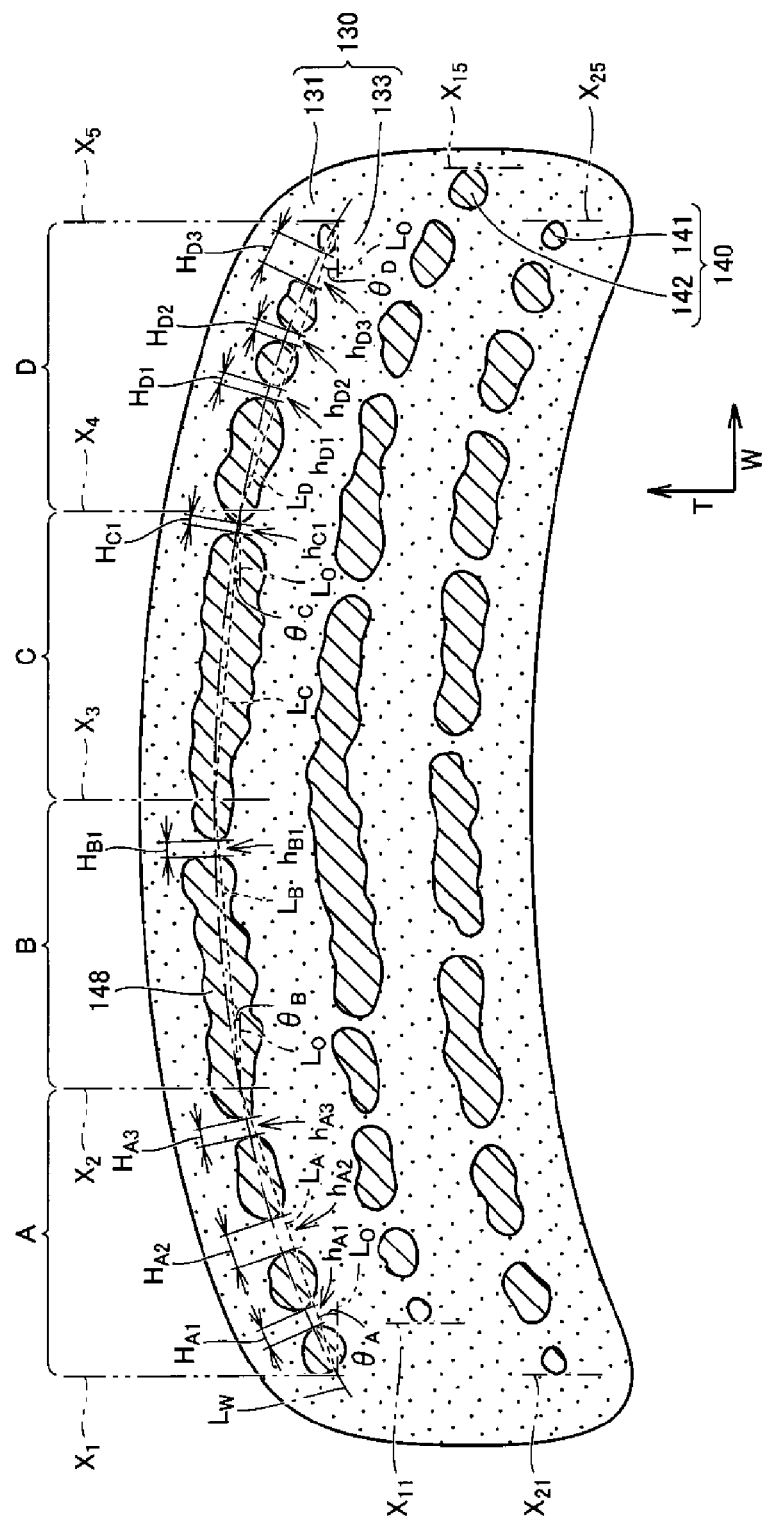
FIG. 6 is an enlarged cross-sectional view of the area VI enclosed by dot-dash lines in FIG. 3.
Figure 7:
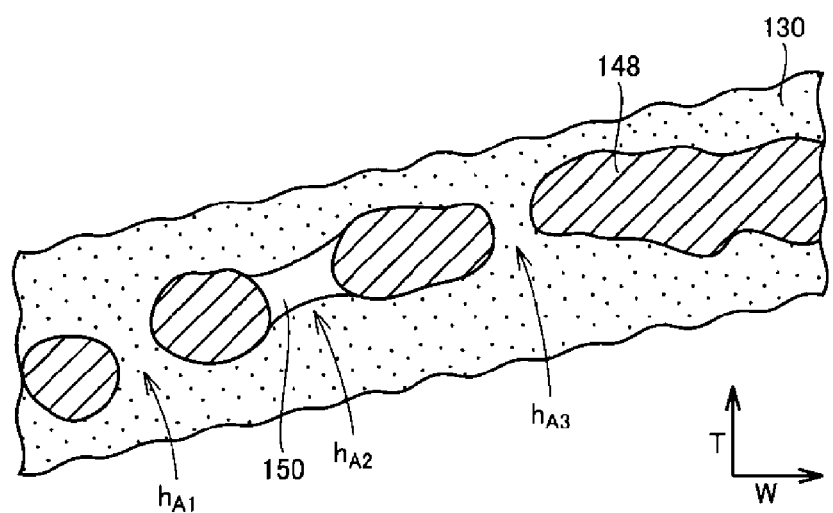
FIG. 7 is an enlarged cross-sectional view of a portion of FIG. 6.

FIG. 1 is a perspective view showing the appearance of a multilayer capacitor of Preferred Embodiment 1 of the present invention. FIG. 2 is a cross-sectional view of the multilayer capacitor of FIG. 1 taken along line II-II. FIG. 3 is a cross-sectional view of the multilayer capacitor of FIG. 1 taken along line III-III. FIG. 4 is a cross-sectional view of the multilayer capacitor of FIG. 2 taken along line IV-IV. FIG. 5 is a cross-sectional view of the multilayer capacitor of FIG. 2 taken along line V-V. FIG. 6 is an enlarged cross-sectional view of the area VI enclosed by dot-dash lines in FIG. 3. FIG. 7 is an enlarged cross-sectional view of a portion of FIG. 6. In FIG. 1, a lengthwise direction L of the multilayer body, a widthwise direction W of the multilayer body, and a stacking direction T of the multilayer body are defined (these are described layer). It should be noted here that only some of the conductive layers and dielectric layers are illustrated for ease of understanding.

As illustrated in FIGS. 1 to 7, a multilayer capacitor 100 of Preferred Embodiment 1 of the present invention includes: a multilayer body 110 including conductive layers 140 and dielectric layers 130 arranged on top of each other in an alternating manner; and a pair of outer electrodes 120 (a first outer electrode 121 and a second outer electrode 122) disposed on the surface of the multilayer body 110.

The stacking direction T in which the dielectric layers 130 and the conductive layers 140 are stacked on top of each other is perpendicular or substantially perpendicular to the lengthwise direction L and the widthwise direction W of the multilayer body 110.

The multilayer body 110 includes first and second main surfaces 111 and 112 opposite each other. The multilayer body 110 further includes: first and second end surfaces 115 and 116 opposite each other and adjacent to the first and second main surfaces 111 and 112; and first and second side surfaces 113 and 114 opposite each other and adjacent to the first and second main surfaces 111 and 112 and the first and second end surfaces 115 and 116. The shortest distance between the first and second side surfaces 113 and 114 is smaller than the shortest distance between the first and second end surfaces 115 and 116. That is, the multilayer body 110 is shorter in the widthwise direction W than in the lengthwise direction L. Note, however, that the multilayer body 110 may be longer in the widthwise direction W than in the lengthwise direction L. The multilayer body 110 preferably is substantially in the shape of a cuboid. Here, at least one of the corners and edges of the cuboid may be rounded.

The multilayer capacitors in the preferred embodiments of the present invention include the multilayer body 110 which is substantially rectangle and whose sides are each about 0.3 mm or smaller in length when viewed from the stacking direction T (i.e., when viewed from above), for example. Preferably, the external dimensions of the multilayer body 110 are as follows: length is about 0.3 mm or smaller; and width is about 0.15 mm or smaller, for example. In the present preferred embodiment, the external dimensions (design dimensions) of the multilayer body 110 preferably are as follows: length is about 0.213 mm; width is about 0.103 mm; and thickness is about 0.103 mm, for example.

In the present preferred embodiment, the pair of outer electrodes 120 are disposed on the surface of the multilayer body 110 so as to be spaced apart from each other in the lengthwise direction L of the multilayer body 110. Specifically, the pair of outer electrodes 120 include the first and second outer electrodes 121 and 122 disposed at the opposite ends in the lengthwise direction L (where there exist the first and second end surfaces 115 and 116, respectively) of the multilayer body 110.

In the multilayer body 110, the conductive layers 140 and the dielectric layers 130 are arranged on top of each other in an alternating manner. Each of the conductive layers 140 is disposed in a first arrangement or a second arrangement different from the first arrangement so that the conductive layers 140 are present in the first and second arrangements when viewed from the stacking direction T.

The conductive layers 140 include: first conductive layers 141 disposed in the first arrangement and connected to the first outer electrode 121; and second conductive layers 142 disposed in the second arrangement and connected to the second outer electrode 122.

The first conductive layers 141 and the second conductive layers 142 each preferably have a rectangular or substantially rectangular shape when viewed from above. More specifically, when each of the first conductive layers 141 is viewed from above, three sides other than the first end surface 115 are each bowed outward in a convex curve and, when each of the second conductive layers 142 is viewed from above, three sides other than the second end surface 116 are each bowed outward in a convex curve.

It is preferable that, in each of the first and second conductive layers 141 and 142, the total amount of curvature in the widthwise direction W of the two sides extending in the lengthwise direction L be larger than the amount of curvature in the lengthwise direction L of the side extending in the widthwise direction W. In this arrangement, the first and second conductive layers 141 and 142 are spaced away from the corners of the multilayer body 110. This provides a better moisture resistance. In addition, the first and second conductive layers 141 and 142 are widened along their entire length. This increases the area of overlap between the first and second conductive layers 141 and 142 and provides a larger electrostatic capacitance. For the same reasons, it is preferable that the amount of curvature in the widthwise direction W of each of the two sides extending in the lengthwise direction L be larger than the amount of curvature in the lengthwise direction L of the side extending in the widthwise direction W.

The amount of curvature in the widthwise direction W of each of the two sides extending in the lengthwise direction L, the total amount of curvature in the widthwise direction W of the two sides extending in the lengthwise direction L, and the amount of curvature in the lengthwise direction L of the side extending in the widthwise direction W are each calculated in the following manner.

As shown in FIG. 4, two straight lines $SL_1$, which are parallel or substantially parallel to the side surfaces of the multilayer body, are drawn from one end (one of the opposite ends in the lengthwise direction L which is exposed on the end surface 115) of a first conductive layer 141. A straight line $SL_3$ is drawn which passes through the intersections of the edge of the first conductive layer 141 and the two straight lines $SL_1$. As shown in FIG. 5, two straight lines $SL_2$, which are parallel or substantially parallel to the side surfaces of the multilayer body, are drawn from one end (one of the opposite ends in the lengthwise direction L which is exposed on the end surface 116) of a second conductive layer 142. A straight line $SL_3$ is drawn which passes through the intersections of the edge of the second conductive layer 142 and the two straight lines $SL_2$.

In FIG. 4, the amount of curvature in the widthwise direction W of the two sides extending in the lengthwise direction L is (i) the longest distance $V_1$ from one of the straight lines $SL_1$ to the edge of the first conductive layer 141 running along the first side surface 113 and (ii) the longest distance $V_2$ from the other of the straight lines $SL_1$ to the edge of the first conductive layer 141 running along the second side surface 114. The sum of these distances is $(V_1+V_2)$. In FIG. 5, the amount of curvature in the widthwise direction W of the two sides extending in the lengthwise direction L is (i) the longest distance $V_1$ from one of the straight lines $SL_2$ to the edge of the second conductive layer 142 running along the first side surface 113 and (ii) the longest distance $V_2$ from the other of the straight lines $SL_2$ to the edge of the second conductive layer 142 running along the second side surface 114. The sum of these distances is $(V_1+V_2)$.

In FIG. 4, the amount of curvature in the lengthwise direction L of the side extending in the widthwise direction W is the longest distance $V_3$ from the straight line $SL_3$ to the edge of the first conductive layer 141 running along the second end surface 116. In FIG. 5, the amount of curvature in the lengthwise direction L of the side extending in the widthwise direction W is the longest distance $V_3$ from the straight line $SL_3$ to the edge of the second conductive layer 142 running along the first end surface 115.

In the present preferred embodiment, each of the first conductive layers 141 is exposed on the first end surface 115 of the multilayer body 110 and is connected to the first outer electrode 121 on the first end surface 115, and each of the second conductive layers 142 is exposed on the second end surface 116 of the multilayer body 110 and is connected to the second outer electrode 122 on the second end surface 116. In the present preferred embodiment, the number of the first conductive layers 141 is 21, and the number of the second conductive layers 142 preferably is 21, for example. That is, the number of the conductive layers 140 preferably is 42, for example.

As shown in FIG. 3, the width $H_{140}$ of each of the conductive layers 140 is not more than about 80% of the width $H_{110}$ of the multilayer body 110. The maximum difference between the width $H_{110}$ of the multilayer body 110 and the width $H_{140}$ of each of the conductive layer 140 preferably is less than about 0.07 mm, for example. With this arrangement, the conductive layers 140 are easier to flatten out and bend (this is described later). In the present preferred embodiment, the width $H_{140}$ (design width) of each of the conductive layers 140 preferably is about 0.063 mm, for example. That is, the width $H_{140}$ (design width) of each of the conductive layers 140 preferably is about 61% of the width $H_{110}$ (design width) of the multilayer body 110, for example. The maximum difference between the width $H_{110}$ (design width) of the multilayer body 110 and the width $H_{140}$ (design width) of each of the conductive layers 140 preferably is about 0.04 mm, for example.

The maximum distance $G_1$ (design distance) between the second side surface 114 of the multilayer body 110 and each of the conductive layers 140 in the widthwise direction W preferably is about 0.02 mm, and the maximum distance $G_2$ (design distance) between the first side surface 113 of the multilayer body 110 and each of the conductive layers 140 in the widthwise direction W preferably is about 0.02 mm, for example.

The length (design length) of each of the conductive layers 140 preferably is about 0.135 mm, for example. The maximum difference in length (design length) between the multilayer body 110 and each of the conductive layers 140 preferably is about 0.078 mm, for example. The thickness (design thickness) of each of the conductive layers 140 preferably is about 0.6 µm, for example.

The dielectric layers 130 include: a first outer layer portion 131 which constitutes the first main surface 111; a second outer layer portion 132 which constitutes the second main surface 112; and effective dielectric layers 133 sandwiched between the first and second conductive layers 141 and 142. In the multilayer body 110, the portion between the first and second outer layer portions 131 and 132 is referred to as an intermediate portion. In the present preferred embodiment, the thickness (design thickness) of each of the effective dielectric layers 133 preferably is about 0.75 µm, for example. The number of the effective dielectric layers 133 preferably is 41, for example. The thickness (design thickness) of each of the first and second outer layer portions 131 and 132 preferably is about 23 µm, for example.

The thickness of each of the conductive layers 140 and the dielectric layers 130 is measured by exposing a cross section of the multilayer body 110 perpendicular or substantially perpendicular to the lengthwise direction L (such a cross section is hereinafter referred to as a widthwise cross section) by grinding the multilayer body 110 and observing the exposed cross section under a scanning electron microscope. The thickness is measured along the following five lines: the center line running in the stacking direction T of the multilayer body 110; and two equally-spaced lines on each side of the center line of the multilayer body 110. The mean of these five thicknesses is calculated.

In the multilayer capacitor 100 of the present preferred embodiment, each of the conductive layers 140 is bent. Specifically, the conductive layers 140 are bent in the following manner. As shown in FIG. 2, in a cross section perpendicular or substantially perpendicular to the widthwise direction W (such a cross section is hereinafter referred to as a lengthwise cross section) of the multilayer body 110, each of the conductive layers 140 is convex outward away from the center of the multilayer body 110 in the stacking direction T. As shown in FIG. 3, in a widthwise cross section of the multilayer body 110, each of the conductive layers 140 is convex outward away from the center of the multilayer body 110 in the stacking direction T. It should be noted that not all the conductive layers 140 have to be convex in the stacking direction T, provided that at least one of the conductive layers 140 is convex in the stacking direction T.

It is preferable that the amount of convexity of the conductive layers 140 increases with approaching the outermost portions of the multilayer body 110 in the stacking direction T. This prevents the dielectric layers 130 from becoming too thick and thus prevents a decrease in electrostatic capacitance, and prevents the dielectric layers 130 from becoming too thin and thus prevents a decrease in insulation resistance.

As shown in FIG. 3, in the widthwise cross section of the multilayer body 110, the amount of convexity of each of two conductive layers 140 which are outermost in the stacking direction T of the multilayer body 110 is larger than the thickness of the effective dielectric layer 133 adjoining this conductive layer 140. The following provides specific examples. The amount of convexity $B_1$ of an outermost conductive layer 148, which is closest to the first main surface 111 in the stacking direction T of the multilayer body 110, is larger than the thickness of the effective dielectric layer 133 adjoining the outermost conductive layer 148. The amount of convexity $B_2$ of an outermost conductive layer 149, which is closest to the second main surface 112 in the stacking direction T of the multilayer body 110, is larger than the thickness of the effective dielectric layer 133 adjoining the outermost conductive layer 149. In the present preferred embodiment, the amount of convexity $B_1$ of the outermost conductive layer 148 and the amount of convexity $B_2$ of the outermost conductive layer 149 preferably are each about 7.1 µm, for example.

The amount of convexity of each of the outermost conductive layers 148 and 149 is preferably larger in a widthwise cross section of the multilayer body 110 than in a lengthwise cross section of the multilayer body 110.

Assume that, in a widthwise cross section of the multilayer body 110 as shown in FIG. 6, a bent conductive layer 140 is equally divided into four regions named region A, region B, region C, and region D which are arranged in the order named in the widthwise direction W. The angle of inclination of the bent conductive layer 140 is larger in the region A than in the region B and is larger in the region D than in the region C.

This is specifically described below using the outermost conductive layer 148 as an example. Five straight lines $X_1$ to $X_5$, each of which extends in the stacking direction T of the multilayer body 110, are drawn so that the outermost conductive layer 148 is equally divided into four regions arranged in the widthwise direction W. The region between the straight lines $X_1$ and $X_2$ is the region A, the region between the straight lines $X_2$ and $X_3$ is the region B, the region between the straight lines $X_3$ and $X_4$ is the region C, and the region between the straight lines $X_4$ and $X_5$ is the region D.

Assume that, in the widthwise cross section of the multilayer body 110, a curved center line passing through the center of the outermost conductive layer 148 is a center line $L_w$ and each straight line parallel or substantially parallel to a straight line connecting the center of the first side surface 113 of the multilayer body 110 with the center of the second side surface 114 of the multilayer body 110 is a reference line $L_0$. Assume that an acute angle $\theta_A$ between a line segment $L_A$ (i.e., a line secant to the curved center line $L_w$ in the region A) and the reference line $L_0$ is the angle of inclination of the outermost conductive layer 148 in the region A. Similarly, assume that an acute angle $\theta_B$ between a line segment $L_B$ (i.e., a line secant to the curved center line $L_w$ in the region B) and the reference line $L_0$ is the angle of inclination of the outermost conductive layer 148 in the region B, an acute angle $\theta_C$ between a line segment $L_C$ (i.e., a line secant to the curved center line $L_w$ in the region C) and the reference line $L_0$ is the angle of inclination of the outermost conductive layer 148 in the region C, and an acute angle $\theta_D$ between a line segment $L_D$ (i.e., a line secant to the curved center line $L_w$ in the region D) and the reference line $L_0$ is the angle of inclination of the outermost conductive layer 148 in the region D.

In the present preferred embodiment, the mean angle of inclination of the two outermost conductive layers 148 and 149 in the regions A, B, C, and D preferably is as follows: $\theta_A$ is about 22.4°; $\theta_B$ is about 6.0°; $\theta_C$ is about 7.3°; and $\theta_D$ is about 23.9°, for example. The angle of inclination of each conductive layer 140 can be measured by exposing a widthwise cross section of the multilayer body 110 by grinding the multilayer body 110 and observing the cross section under an optical microscope.

As shown in FIGS. 6 and 7, each conductive layer 140 has penetrating portions each extending in the stacking direction T of the multilayer body 110. The penetrating portions are not illustrated in FIG. 3. It should be noted that not all the conductive layers 140 have to have the penetrating portions each extending in the stacking direction T of the multilayer body 110, provided that at least one of the conductive layers 140 has the penetrating portions each extending in the stacking direction T of the multilayer body 110.

This is specifically described using the outermost conductive layer 148 as an example. The outermost conductive layer 148 preferably includes three penetrating portions $h_{A1}$, $h_{A2}$, and $h_{A3}$ in the region A, one penetrating portion $h_{B1}$ in the region B, one penetrating portion $h_{C1}$ in the region C, and three penetrating portions $h_{D1}$, $h_{D2}$, and $h_{D3}$ in the region D.

The sum of the minimum diameter(s) of the penetrating portion(s) along a bent conductive layer 140 is larger in the region A than in the region B and is larger in the region D than in the region C. The minimum diameter of each penetrating portion along the bent conductive layer 140 is the shortest distance between the opposite ends of the penetrating portion on the center line $L_w$.

Specifically, for example, in the case of the outermost conductive layer 148, the minimum diameters of the penetrating portions $h_{A1}$, $h_{A2}$, $h_{A3}$, $h_{B1}$, $h_{D1}$, $h_{D2}$, and $h_{D3}$ are $H_{A1}$, $H_{A2}$, $H_{A3}$, $H_{B1}$, $H_{C1}$, $H_{D1}$, $H_{D2}$, and $H_{D3}$, respectively, where $H_{A1}+H_{A2}+H_{A3}>H_{B1}$ is satisfied and $H_{D1}+H_{D2}+H_{D3}>H_{C1}$ is satisfied.

As has been described, in each conductive layer 140, the total number of penetrating portions and the sum of the diameters of the penetrating portions both increase toward the opposite ends in the widthwise direction W. This is because each conductive layer 140 has been flattened out and bent and therefore has a low density (this is described later). In particular, the outermost conductive layers 148 and 149, which are conductive layers 140 disposed outermost in the stacking direction T of the multilayer body 110, have a small radius of curvature and have an even lower density after bending. Therefore, the outermost conductive layers 148 and 149 have a lot of relatively large penetrating portions.

In the present preferred embodiment, the mean number of penetrating portions in each of the regions A to D in all the conductive layers 140 preferably is as follows: about 1.5 in the region A; about 0.2 in the region B; about 0.2 in the region C; and about 1.2 in the region D, for example. Furthermore, the mean of the sum of the diameters of penetrating portions in each of the regions A to D in all the conductive layers 140 preferably is as follows: about 2.2 µm in the region A; about 0.2 µm in the region B; about 0.2 µm in the region C; and about 1.8 µm in the region D, for example.

The diameter of each penetrating portion can be measured by exposing a widthwise cross section of the multilayer body 110 by grinding the multilayer body 110 and observing the cross section under a scanning electron microscope.

In FIG. 6, all the penetrating portions contain filler which contains the dielectric material constituting the dielectric layers 130. However, in reality, as shown in FIG. 7, some of the penetrating portions contain the filler but the other of the penetrating portions have voids 150. Specifically, for example, in the case of the region A of the outermost conductive layer 148, each of the penetrating portions $h_{A1}$ and $h_{A3}$ contains the filler containing the dielectric material whereas the penetrating portion $h_{A2}$ has a void 150.

Since penetrating portions contain the filler containing the dielectric material, dielectric layers 130, which are adjacent to each other with a conductive layer 140 therebetween, more strongly adhere to each other. For stronger adhesion between the dielectric layers 130, it is preferable that, for example, barium titanate (the dielectric material) contain silicon. The composition of the filler can be identified by exposing a widthwise cross section of the multilayer body 110 by grinding the multilayer body 110 and observing the cross section with the use of a field emission wavelength dispersive X-ray spectrometer on a scanning electron microscope.

Furthermore, it is preferable that, for stronger adhesion between the adjacent dielectric layers 130 described above, the opposite ends of the conductive layers 140 in the widthwise direction W be displaced from each other (see FIG. 6). One of the opposite ends in the width direction W of the outermost conductive layer 148 coincides with the straight line $X_1$, that of the second conductive layer 142 adjacent to the outermost conductive layer 148 coincides with the straight line $X_{11}$, and that of the first conductive layer 141 adjacent to the second conductive layer 142 coincides with the straight line $X_{21}$. The straight lines $X_1$, $X_{11}$, and $X_{21}$ are displaced from each other in the widthwise direction W.

Similarly, the other of the opposite ends in the width direction W of the outermost conductive layer 148 coincides with the straight line $X_5$, that of the second conductive layer 142 adjacent to the outermost conductive layer 148 coincides with the straight line $X_{15}$, and that of the first conductive layer 141 adjacent to the second conductive layer 142 coincides with the straight line $X_{25}$. The straight lines $X_5$, $X_{15}$, and $X_{25}$ are displaced from each other in the widthwise direction W.

The following specifically describes constituents of the multilayer capacitor 100.

The dielectric layers 130 may be made from a dielectric ceramic material containing, as a main component, $BaTiO_3$, $CaTiO_3$, $SrTiO_3$, $CaZrO_3$, or the like. Alternatively, the dielectric layers 130 may be made from a dielectric ceramic material obtained by adding, to the main component, a secondary component such as a manganese compound, a magnesium compound, a silicon compound, a cobalt compound, a nickel compound, a rare earth compound, or the like. In the present preferred embodiment, the dielectric layers 130 preferably are made from a dielectric ceramic material containing $BaTiO_3$ (barium titanate) as a main component and having a relative permittivity of about 3400 so that the electrostatic capacitance (design capacitance) of the multilayer capacitor 100 is about 0.01 µF, for example.

The conductive layers 140 may be made from, for example, a metal such as nickel, copper, silver, palladium, gold, or the like or an alloy containing at least one of these metals such as a silver-palladium alloy. It is preferable that the conductive layers 140 further contain the same dielectric material as in the dielectric layers 130 (such a material is hereinafter referred to as a co-material). For example, in the case where the dielectric material constituting the dielectric layers 130 is $BaTiO_3$, the conductive layers 140 preferably contain $BaTiO_3$ as a co-material. Furthermore, the conductive layers 140 preferably further contain silicon as a co-material. The thickness of each of the conductive layers 140 after firing is preferably about 0.2 µm or larger and about 2.0 µm or smaller, for example.

The pair of outer electrodes 120 includes: a base layer which covers the opposite ends of the multilayer body 110; and a plating layer which covers the base layer. The base layer may be made from, for example, a metal such as nickel, copper, silver, palladium, gold, or the like or an alloy containing at least one of these metals such as a silver-palladium alloy. The thickness of the base layer is preferably about 5 µm or larger and about 20 µm or smaller, for example.

The base layer may be formed by applying a conductive paste to the opposite ends of the multilayer body 110 and baking the conductive paste or may be formed by firing the conductive paste together with the conductive layers 140. Alternatively, the base layer may be formed by plating the opposite ends of the multilayer body 110 or may be formed by applying a resin paste containing metal particles to the opposite end of the multilayer body 110 and allowing the resin paste to cure.

The plating layer may be made from, for example, a metal such as nickel, copper, silver, palladium, gold, or the like or an alloy containing at least one of these metals such as a silver-palladium alloy.

The plating layer may include multiple layers. In this case, the plating layer is preferably a double layer composed of a nickel plating layer and a tin plating layer disposed on the nickel plating layer. The nickel plating layer defines and functions as a solder blocking layer. The tin plating layer is highly wettable with solder. The thickness of each layer in the plating layer is preferably about 0.5 µm or larger and about 5 µm or smaller, for example.

Figure 8:
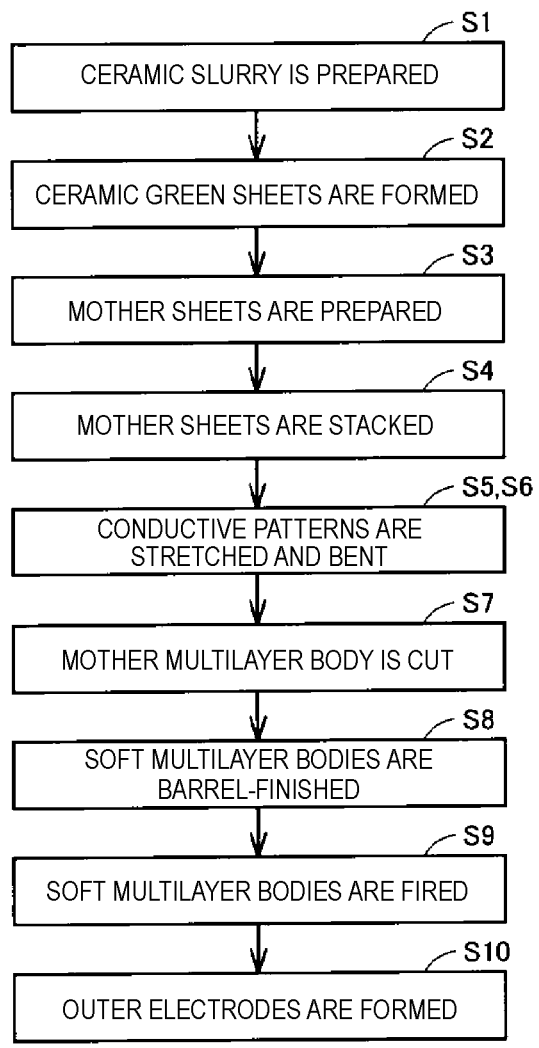
FIG. 8 is a flowchart showing a method for producing a multilayer ceramic capacitor of Preferred Embodiment 1 of the present invention.

The following describes a method for producing the multilayer capacitor 100 of the present preferred embodiment. FIG. 8 is a flowchart showing a method for producing a multilayer ceramic capacitor of Preferred Embodiment 1 of the present invention.

As shown in FIG. 8, the production of the multilayer capacitor 100 starts with preparation of a ceramic slurry (step S1). Specifically, ceramic powder, binder, solvent, and the like are mixed in a predetermined ratio, such that a ceramic slurry is made.

Next, ceramic green sheets are formed (step S2). Specifically, a ceramic green sheet is formed by shaping the ceramic slurry into a sheet on a carrier film with the use of a die coater, a gravure coater, a micro gravure coater, or the like.

Figure 10:
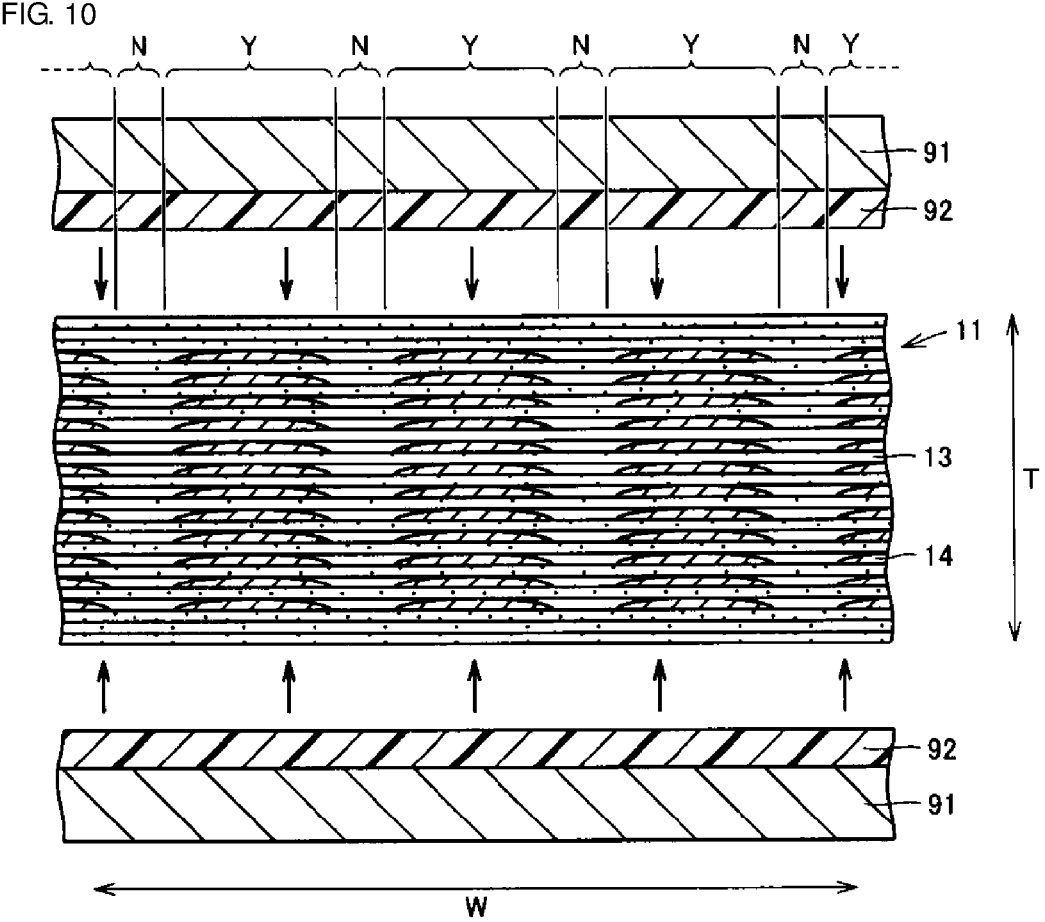
FIG. 10 is a cross-sectional view of the stack of mother sheets, which is not pressed yet, of the multilayer capacitor of Preferred Embodiment 1 of the present invention in the widthwise direction W of the multilayer capacitor.

Next, mother sheets are prepared (step S3). Specifically, a conductive paste for conductive layers is applied onto some of the above-obtained ceramic green sheets in a predetermined pattern by screen printing method or gravure printing method. The conductive paste preferably contains a co-material described earlier. As shown in FIG. 10 (described later), each conductive pattern 14 has a curved shape which is tapered in thickness from the center thereof to the ends thereof.

The ceramic green sheets which have conductive patterns for conductive layers thereon and ceramic green sheets having no conductive patterns thereon thus prepared are used as mother sheets. It should be noted that the conductive paste for conductive layers may contain a known binder and solvent.

Next, the mother sheets are stacked together (step S4). Specifically, the mother sheets are stacked in the following manner. A predetermined number of ceramic green sheets having no conductive patterns thereon are stacked together to form a second outer layer portion 132. On top of this, a plurality of ceramic green sheets having conductive patterns thereon are orderly stacked to define an intermediate portion. On top of this, a predetermined number of ceramic green sheets having no conductive patterns thereon are stacked together to define a first outer layer portion 131. In this way, a stack of mother sheets is formed.

Next, the stack of mother sheets is pressed and thus the conductive patterns for conductive layers are stretched (step S5) and bent (step S6). It should be noted that, in the present preferred embodiment, step S5 for stretching the conductive patterns for conductive layers and step S6 for bending the conductive patterns for conductive layers are performed concurrently. Note, however, that this does not imply any limitation and that step S5 and step S6 may be performed separately. For example, the following process may be used. A stack of mother sheets only for the intermediate portion is pressed and thus the conductive patterns for conductive layers are stretched (this is step S5) and thereafter a predetermined number of ceramic green sheets, which constitute at least one of the first and second outer layer portions 131 and 132, are stacked on the mother sheets and are pressed again, such that the conductive patterns for conductive layers are bent (this is step S6).

Figure 9:
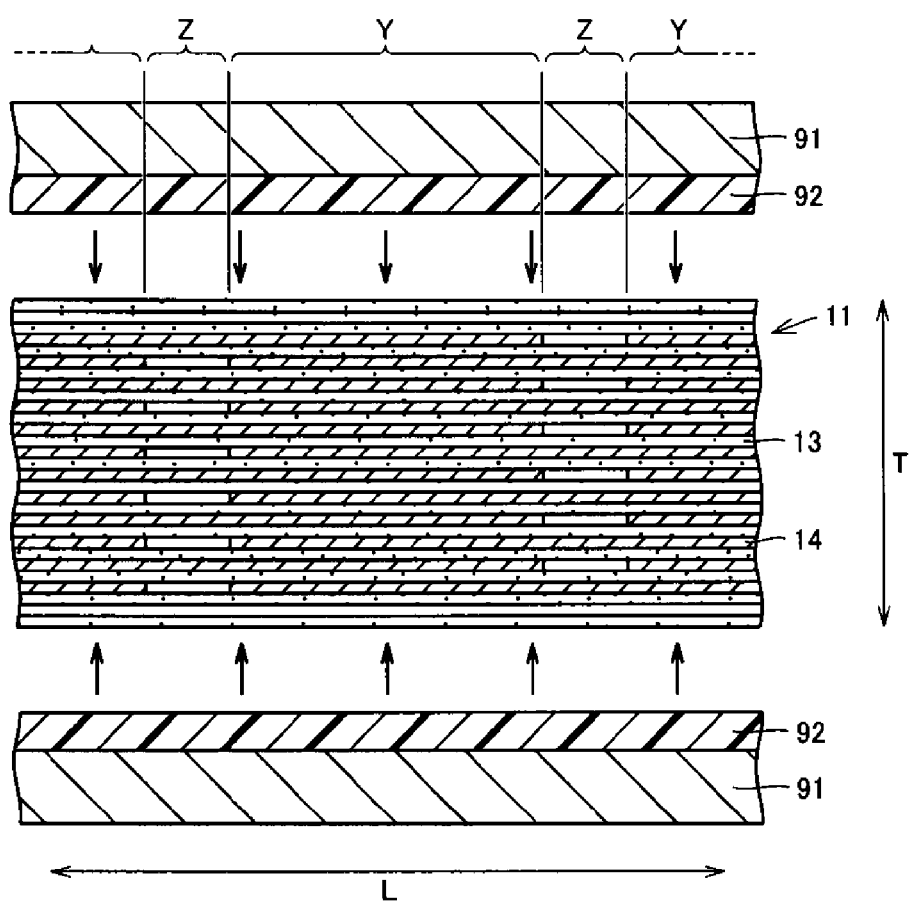
FIG. 9 is a cross-sectional view of a stack of mother sheets, which is not pressed yet, of the multilayer capacitor of Preferred Embodiment 1 of the present invention in the lengthwise direction L of the multilayer capacitor.
Figure 11:
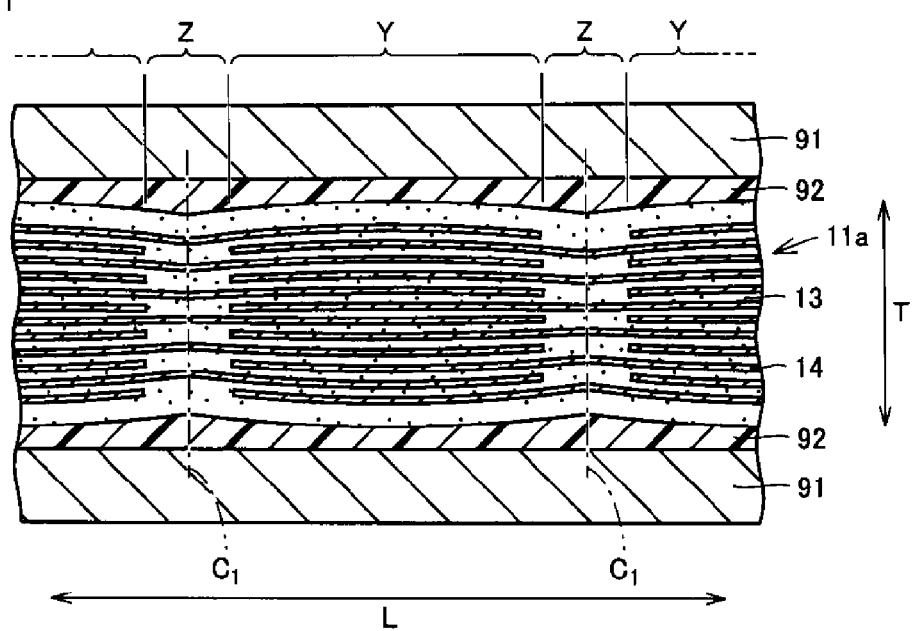
FIG. 11 is a cross-sectional view of the pressed stack of mother sheets of the multilayer capacitor of Preferred Embodiment 1 of the present invention in the lengthwise direction L of the multilayer capacitor.
Figure 12:
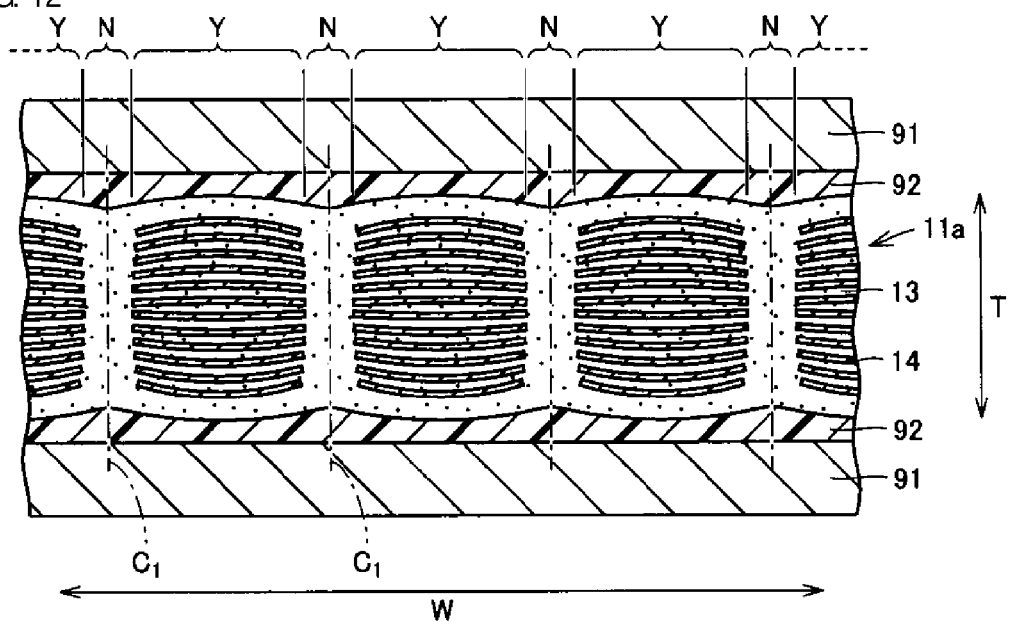
FIG. 12 is a cross-sectional view of the pressed stack of mother sheets of the multilayer capacitor of Preferred Embodiment 1 of the present invention in the widthwise direction W of the multilayer capacitor.

FIG. 9 is a cross-sectional view of a stack of mother sheets, which is not pressed yet, of the multilayer capacitor of Preferred Embodiment 1 of the present invention in the lengthwise direction L of the multilayer capacitor. FIG. 10 is a cross-sectional view of the stack of mother sheets, which is not pressed yet, of the multilayer capacitor of Preferred Embodiment 1 of the present invention in the widthwise direction W of the multilayer capacitor. FIG. 11 is a cross-sectional view of the pressed stack of mother sheets (i.e., mother multilayer body) of the multilayer capacitor of Preferred Embodiment 1 of the present invention in the lengthwise direction L of the multilayer capacitor. FIG. 12 is a cross-sectional view of the pressed stack of mother sheets (i.e., mother multilayer body) of the multilayer capacitor of Preferred Embodiment 1 of the present invention in the widthwise direction W of the multilayer capacitor.

As shown in FIG. 9, a stack of mother sheets 11 includes regions Y and regions Z arranged in an alternating manner in the lengthwise direction L. The regions Y include a lot of conductive patterns 14 and the regions Z include only a relatively small number of conductive patterns 14. On the other hand, as shown in FIG. 10, the stack of mother sheets 11 includes the regions Y and regions N arranged in an alternating manner in the widthwise direction W. The regions Y include a lot of conductive patterns 14 and regions N only include a dielectric portion 13 and have no conductive patterns 14.

As shown in FIGS. 9 to 12, the stack of mother sheets is pressed in the stacking direction T and pressure-bonded with the use of a pair of flat dies 91. The stack of mother sheets 11 is arranged such that the number of layers is larger in the regions Y than in the regions Z and N. Therefore, the conductive patterns 14 in the regions Y are pressed out into the regions Z and N. The conductive patterns 14 have a curved shape which is tapered in thickness from the center thereof to the ends thereof when viewed in a cross section. Therefore, the edge portion of the conductive patterns 14 becomes very thin when pressed. In addition, the conductive patterns 14, which are pressed out into the regions Z and N, are pushed by the flow of a ceramic material coming from the first or second outer layer portion and thus bent inward. This makes the edge portions of the conductive patterns 14 even thinner. It is preferable that, as shown in FIGS. 9 to 12, the pair of flat dies 91 for pressing the stack of mother sheets 11 have rubber portions 92 on their working surfaces. This makes it possible to bend the conductive patterns 14 more effectively. In this way, a mother multilayer body 11a is formed.

Assume here that, in one of two multilayer bodies which are to be cut from the mother multilayer body (described later) and which are adjacent to each other in their lengthwise direction, a ceramic green sheet having a conductive pattern disposed in the first arrangement (this conductive pattern corresponds to a first conductive layer 141) is referred to as a pattern-A sheet whereas a ceramic green sheet having a conductive pattern disposed in the second arrangement (this conductive pattern corresponds to a second conductive layer 142) is referred to as a pattern-B sheet. When the pattern-A sheet and the pattern-B sheet are stacked together, the ceramic green sheet between the conductive patterns defines and functions as an effective dielectric layer 133.

It should be noted that the pattern-A sheet and the pattern-B sheet may be the same ceramic green sheets having identical conductive patterns thereon, which are displaced from each other when stacked together. That is, the mother multilayer body may be produced from ceramic green sheets having identical conductive patterns thereon.

In the other of the multilayer bodies which are to be cut from the mother multilayer body (described later) and which are adjacent to each other in their lengthwise direction, a ceramic green sheet having a conductive pattern disposed in the first arrangement (this conductive pattern corresponds to a first conductive layer 141) is the pattern-B sheet and a ceramic green sheet having a conductive pattern disposed in the second arrangement (this conductive pattern corresponds to a second conductive layer 142) is the pattern-A sheet. As is clear from this, in each of the multilayer bodies which are to be cut from the mother multilayer body and which are adjacent to each other in their lengthwise direction, conductive layers disposed in the first arrangement and conductive layers disposed in the second arrangement are arranged one above the other with dielectric layers therebetween in the stacking step (step S4).

Next, the mother multilayer body is cut (step S7). Specifically, the mother multilayer body is cut with a hand cutter or a dicing machine along lines $C_1$ in the regions Z and N into a plurality of soft multilayer bodies substantially in the shape of a cuboid. Next, the soft multilayer bodies are barrel-finished if necessary (step S8) so that the outside surface (especially corners and edges) of the soft multilayer bodies is rounded.

Next, the soft multilayer bodies are fired (step S9). Specifically, the soft multilayer bodies are heated at a predetermined temperature, such that the ceramic material and conductive material are sintered. In this way, multilayer bodies 110 are formed. During heating, aggregation of the metal component in the conductive patterns 14 occurs. Since the edge portions of the conductive patterns 14 are very thin, the aggregation of metal component makes penetrating portions in the edge portions of the conductive patterns 14. As described earlier, the conductive patterns 14, which have a curved shape when viewed in a cross section, are flattened out and bent, and heated, such that a relatively large number of penetrating portions are made in the regions A and D.

Next, outer electrodes are formed (step S10). Specifically, a conductive paste for outer electrodes is applied to each end portion of the multilayer body 110 by a printing method or dipping method or the like and heated, such that a base layer is formed.

Next, a plating layer is formed on the base layer by attaching a metal component to the base layer by plating method. The step of forming the base layer and the step of forming the plating layer provide outer electrodes 120 at the opposite end portions of the multilayer body 110 in a way that the outer electrodes 120 are electrically connected to the conductive layers 140. A series of processes described above produces the multilayer capacitor 100 of the present preferred embodiment.

In the multilayer capacitor 100 of the present preferred embodiment, conductive layers 140, which have the effective dielectric layers 133 therebetween, have been stretched and bent. Therefore, the area of overlap between adjacent conductive layers 140 is large. This increases electrostatic capacitance without increasing the size of the multilayer capacitor 100. That is, it is possible to provide a small-sized, large-capacitance multilayer capacitor 100.

Furthermore, since the conductive layers 140 are bent, the end portions of the conductive layers 140 are positioned farther away from the corners of the multilayer body 110. This imparts a high moisture resistance to the multilayer capacitor 100. In particular, the bending of the outermost conductive layers 148 and 149 plays an important role in imparting a high moisture resistance to the multilayer capacitor 100.

In the multilayer capacitor 100, the width $H_{140}$ of each of the conductive layers 140 preferably is not more than about 80% of the width $H_{110}$ of the multilayer body 110, and the maximum difference between the width $H_{110}$ of the multilayer body 110 and the width $H_{140}$ of each of the conductive layers 140 preferably is less than about 0.07 mm, for example. This makes it possible to effectively stretch and bend the conductive patterns.

Specifically, if the region N was too small in FIG. 10, it would be difficult to flatten out the conductive patterns. In this respect, in order to sufficiently flatten out the conductive patterns, it is preferable that the width of the conductive layers 140 be not more than about 80% of the width of the multilayer body 110, for example. On the other hand, if the region N was too large, ceramic green sheets would be bonded together by pressure and voids in the region N would be filled before the conductive patterns are sufficiently flattened out. This would make it difficult to flatten out the conductive patterns. In this respect, in order to sufficiently flatten out the conductive patterns, it is preferable that the maximum difference between the width of the conductive layers 140 and the width of the multilayer body 110 be less than about 0.07 mm, for example. Sufficiently flattened-out conductive layers are easily bent sufficiently by the flow of ceramic green sheets into the region N.

The multilayer capacitor 100 of the present preferred embodiment is structured such that the amount of convexity $B_1$ or $B_2$ of at least one of the two outermost conductive layers 148 and 149, which are disposed at the opposite ends in the stacking direction T of the multilayer body 110, in a widthwise cross section of the multilayer body 110 is larger than the thickness of the effective dielectric layer 133 adjoining this conductive layer 148 or 149. This is preferable to unfailingly obtain the area of substantial overlap between the conductive layers which contributes to electrostatic capacitance.

In the multilayer capacitor 100 of the present preferred embodiment, filler containing a dielectric material is contained in the penetrating portions in the conductive layers 140. Therefore, dielectric layers 133 adjacent to each other with a conductive layer 140 therebetween strongly adhere to each other. This makes it possible to reduce the occurrence of separation of layers. In particular, the outermost conductive layers 148 and 149, which are susceptible to separation because of internal stress resulting from the difference in thermal shrinkage between the dielectric layers 130 and conductive layers 140 when fired, have penetrating portions which contain filler containing a dielectric material. This reduces the occurrence of separation of layers of the multilayer capacitor 100. Furthermore, when the conductive paste for conductive layers 140 contains a dielectric material as a co-material, it is possible to facilitate the formation of filler that contains the dielectric material.

It seems that the reason that the dielectric layers 130 strongly adhere to each other is as follows. In the multilayer capacitor 100 of the present preferred embodiment, the filler contains a dielectric material (barium titanate) which contains silicon. Therefore, the segregation of silicon occurs at grain boundaries of ceramics which grow and increase in grain size while firing. The segregated silicon moves along the grain boundaries of ceramics and collects at the interface between adjacent dielectric layers 130. The adjacent dielectric layers 130 have a lot of minute gaps at the interface between them. These gaps are filled with silicon and thus the adjacent dielectric layers 130 are joined and strongly adhere to each other. Furthermore, when the conductive paste for conductive layers 140 contains silicon as a co-material, it is possible to facilitate the formation of filler that contains silicon. It should be noted that the filler may consist only of silicon.

In the multilayer capacitor 100 of the present preferred embodiment, the opposite ends of the conductive layers 140 in the widthwise direction W are displaced from each other as shown in FIG. 6. Therefore, adjacent dielectric layers 130 near these ends are joined in a zigzag manner and thus strongly adhere to each other. This further reduces the occurrence of separation of layers of the multilayer capacitor 100.

The following is a description of an experiment to test the moisture resistance of the multilayer capacitor of the present preferred embodiment.

EXPERIMENT

The following describes the conditions in which a non-limiting experiment was conducted. 72 multilayer capacitors having an electrostatic capacitance of about 0.01 μF were left to stand for about 2000 hours in an atmosphere having a temperature of about 85° C. and a humidity of about 85% RH, and thereafter a voltage of about 6.3 V was applied and resistance was measured. If the resistance of a multilayer capacitor is about $1.0 \times 10^8 \Omega$ or less, this multilayer capacitor is determined to have a poor moisture resistance. The results showed that none of the multilayer capacitors of the present preferred embodiment had a poor moisture resistance.

The above experiment showed that the multilayer capacitor 100 of the present preferred embodiment does not experience a decrease in moisture resistance. That is, a small-sized, large-capacitance multilayer capacitor was obtained without reducing moisture resistance.

The following describes a multilayer capacitor and a method for producing the multilayer capacitor of Preferred Embodiment 2 of the present invention. It should be noted that, since the multilayer capacitor and the method for producing the multilayer capacitor of the present preferred embodiment are different from the multilayer capacitor and the method for producing the multilayer capacitor of Preferred Embodiment 1 only in a way in which the layers of the multilayer body are stacked, the other constituents are not described here.

Preferred Embodiment 2

Figure 13:
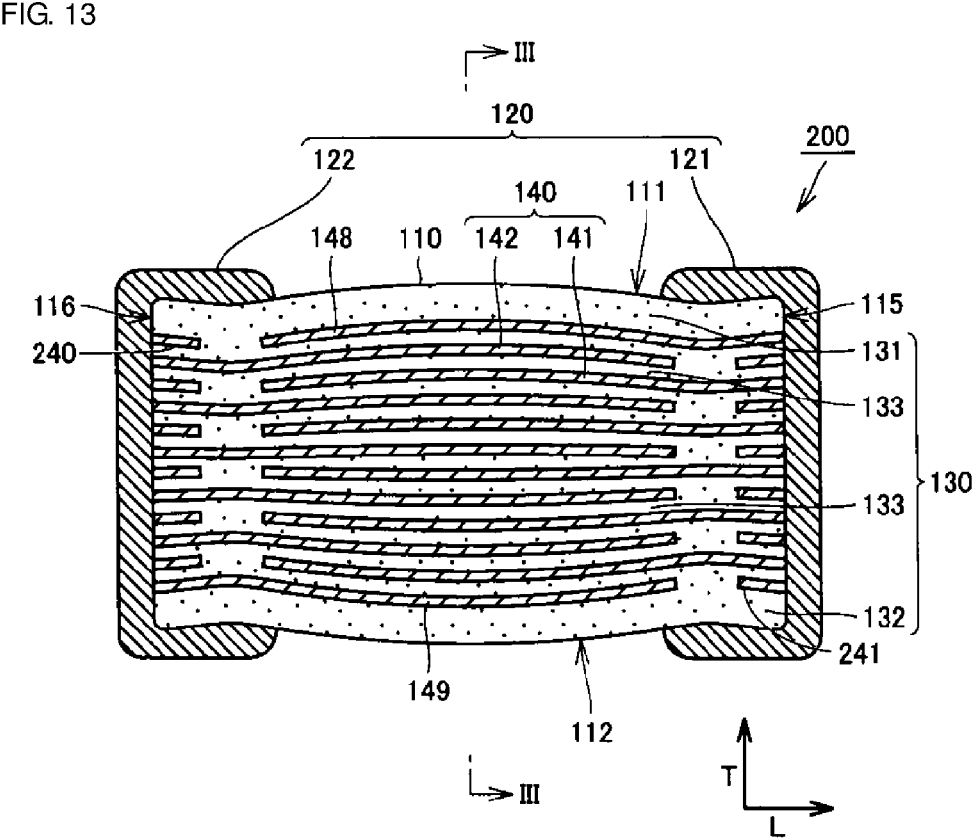
FIG. 13 is a cross-sectional view showing a configuration of a multilayer capacitor of Preferred Embodiment 2 of the present invention.

FIG. 13 is a cross-sectional view showing a configuration of a multilayer capacitor of Preferred Embodiment of the present invention. The cross-sectional view of the multilayer capacitor in FIG. 13 is taken along the same line as FIG. 2. A cross-sectional view of the multilayer capacitor of FIG. 13 taken along line III-III looks the same as that shown in FIG. 3.

As shown in FIG. 13, a multilayer capacitor 200 of Preferred Embodiment 2 of the present invention includes third conductive layers 240 that are connected to a second outer electrode 122 and that are positioned near but separate from end portions, which are closer to a second end surface 116, of first conductive layers 141. The multilayer capacitor 200 further includes fourth conductive layers 241 that are connected to a first outer electrode 121 and that are positioned near but separate from end portions, which are closer to a first end surface 115, of second conductive layers 142.

In the multilayer capacitor 200 of Preferred Embodiment 2 of the present invention, the third and fourth conductive layers 240 and 241 make it difficult for the first and second conductive layers 141 and 142 to spread out in the lengthwise direction L. As a result, the first and second conductive layers 141 and 142 become more likely to spread out in the widthwise direction W. With this arrangement, the first and second conductive layers 141 and 142 are kept away from the corners of the multilayer body 110 and thus a high moisture resistance is maintained and, at the same time, electrostatic capacitance is further increased because the first and second conductive layers 141 and 142 are widened throughout their length and thus the area of overlap between the first and second conductive layers 141 and 142 is large.

In the method for producing the multilayer capacitor of Preferred Embodiment 2 of the present invention, a stack of mother sheets is pressure-bonded in the following manner.

Figure 14:
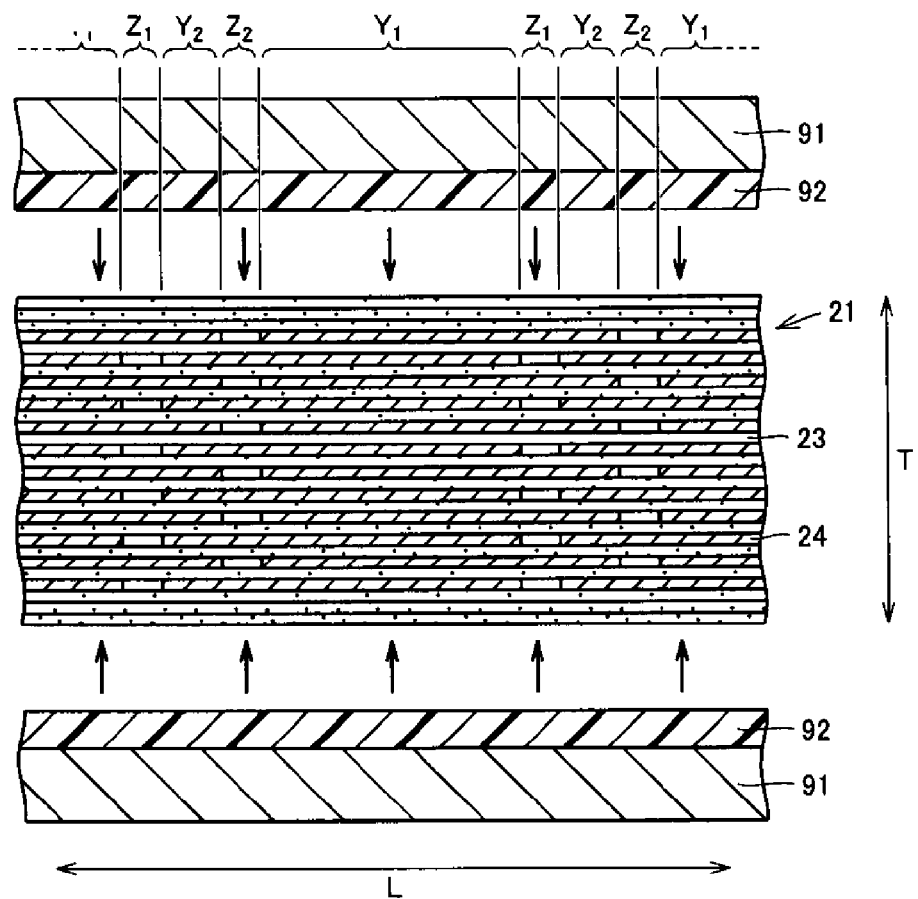
FIG. 14 is a cross-sectional view of a stack of mother sheets, which is not pressed yet, of the multilayer capacitor of Preferred Embodiment 2 of the present invention in the lengthwise direction L of the multilayer capacitor.
Figure 15:
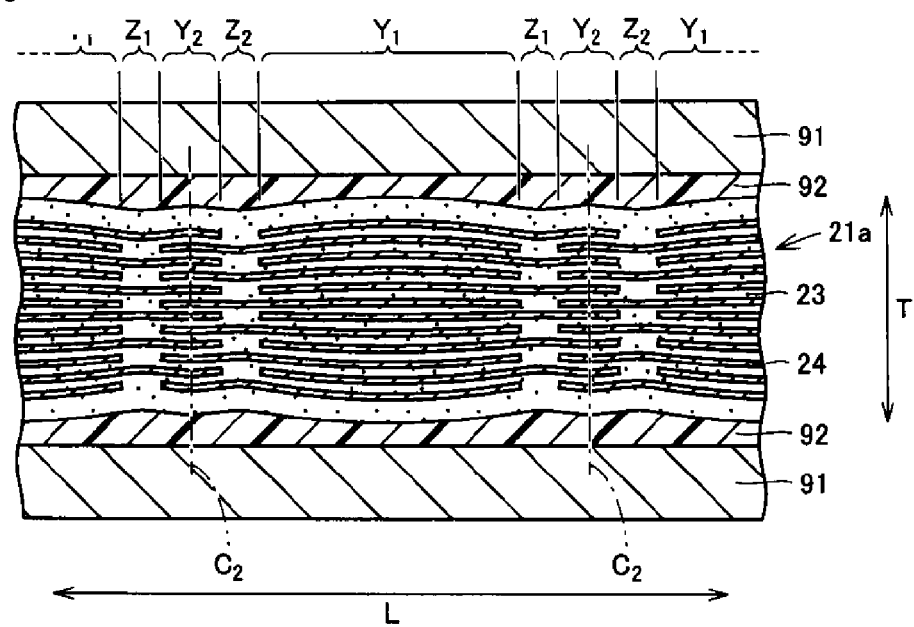
FIG. 15 is a cross-sectional view of the pressed stack of mother sheets of the multilayer capacitor of Preferred Embodiment 2 of the present invention in the lengthwise direction L of the multilayer capacitor.

FIG. 14 is a cross-sectional view of a stack of mother sheets, which is not pressed yet, of the multilayer capacitor of Preferred Embodiment 2 of the present invention in the lengthwise direction L of the multilayer capacitor. FIG. 15 is a cross-sectional view of the pressed stack of mother sheets (i.e., a mother multilayer body) of the multilayer capacitor of Preferred Embodiment 2 of the present invention in the lengthwise direction L of the multilayer capacitor. It should be noted that cross-sections in the widthwise direction W of the multilayer capacitor are the same as those of the stack of mother sheets and the mother multilayer body of Preferred Embodiment 1, and therefore are not described here.

As shown in FIG. 14, a stack of mother sheets 21 includes regions $Y_1$, $Y_2$, $Z_1$, and $Z_2$ repeatedly arranged in the order of $Y_1$, $Z_1$, $Y_2$, and $Z_2$ in the lengthwise direction L. The regions $Y_1$ and $Y_2$ include a lot of conductive patterns 24, and the regions $Z_1$ and $Z_2$ include only a relatively small number of conductive patterns 24.

As shown in FIG. 14, the stack of mother sheets 21 is pressed in the stacking direction T and pressure-bonded with the use of a pair of flat dies 91 having rubber portions 92 on their work surfaces by, for example, isostatic pressing or the like. In the stack of mother sheets 21, the number of layers is larger in the regions $Y_1$ and $Y_2$ than in the regions $Z_1$ and $Z_2$. Therefore, the rubber portions 92 pressed against the stack of mother sheets 21 deform and flow from the regions $Y_1$ and $Y_2$ into the regions $Z_1$ and $Z_2$ and become convex inward as shown in FIG. 15, thus pressure-bonding, like drawing, the mother sheets in the regions $Z_1$ and $Z_2$ of the stack of mother sheets 21. This causes the mother sheets to strongly adhere to each other. In this way, a mother multilayer body 21a is formed.

Next, the mother multilayer body 21a is cut (step S6). Specifically, the mother multilayer body 21a is cut with a hand cutter or a dicing machine along lines $C_2$ in the regions $Y_2$ into a plurality of soft multilayer bodies substantially in the shape of a cuboid.

The method for producing the multilayer capacitor of the present preferred embodiment also provides a small-sized, large-capacitance multilayer capacitor that is highly moisture-resistant and less prone to layer separation.

The following describes a multilayer capacitor and a method for producing the multilayer capacitor of Preferred Embodiment 3 of the present invention. It should be noted that, since the multilayer capacitor and the method for producing the multilayer capacitor of the present preferred embodiment are different from the multilayer capacitor and the method for producing the multilayer capacitor of Preferred Embodiment 1 only in that the multilayer capacitor of the present preferred embodiment includes ineffective dielectric layers, the other constituents are not described here.

Preferred Embodiment 3

Figure 16:
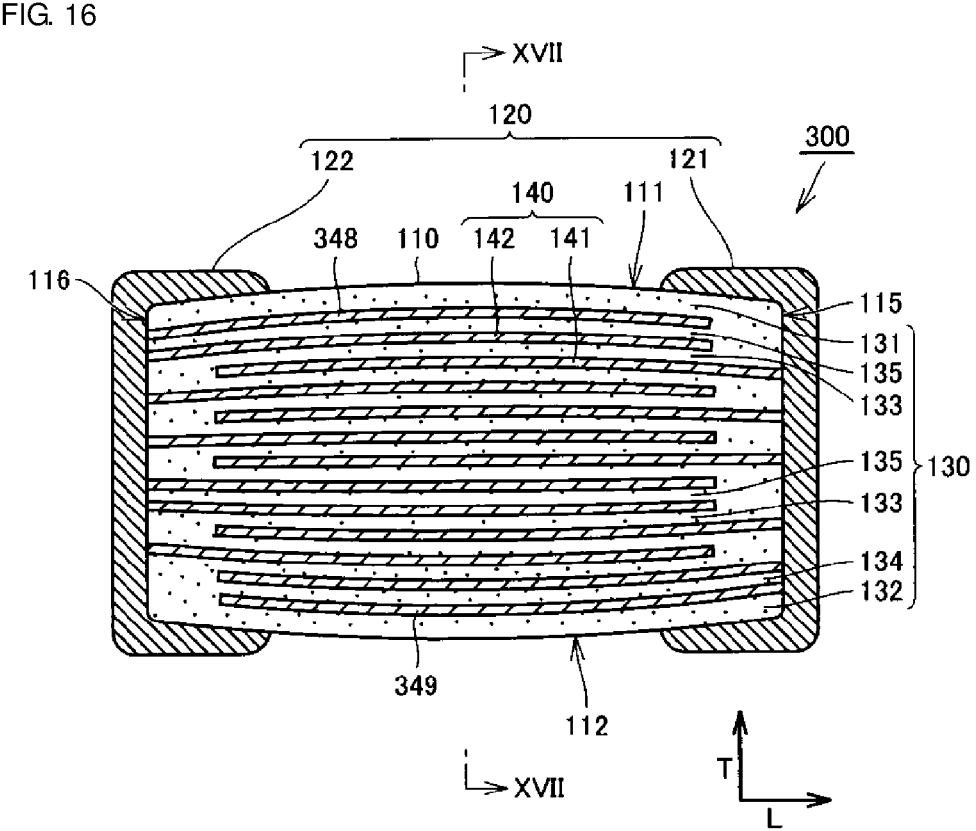
FIG. 16 is a cross-sectional view showing a configuration of a multilayer capacitor of Preferred Embodiment 3 of the present invention.
Figure 17:
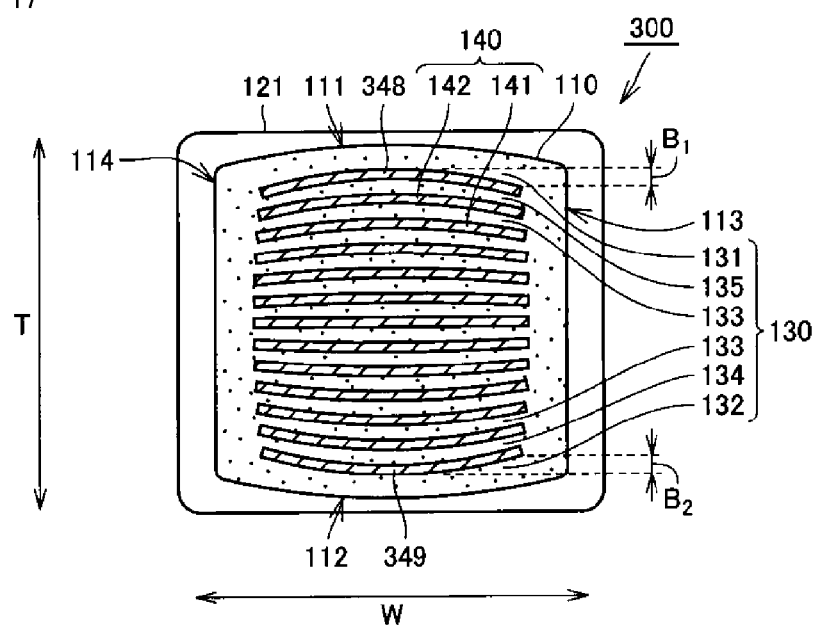
FIG. 17 is a cross-sectional view of the multilayer capacitor of FIG. 16 taken along line XVII-XVII.

FIG. 16 is a cross-sectional view showing a configuration of a multilayer capacitor of Preferred Embodiment 3 of the present invention. FIG. 17 is a cross-sectional view of the multilayer capacitor of FIG. 16 taken along line XVII-XVII. The cross-sectional view of the multilayer capacitor in FIG. 16 is taken along the same line as FIG. 2.

As shown in FIGS. 16 and 17, dielectric layers 130 of a multilayer capacitor 300 of Preferred Embodiment 3 of the present invention include: a first outer layer portion 131 which constitutes a first main surface 111; a second outer layer portion 132 which constitutes a second main surface 112; at least one effective dielectric layer 133 sandwiched between first and second conductive layers 141 and 142; and at least one ineffective dielectric layer sandwiched between first conductive layers 141 or between second conductive layers 142. Examples of the ineffective dielectric layer include: a first ineffective dielectric layer 134 between first conductive layers 141; and a second ineffective dielectric layer 135 between second conductive layers 142.

The thickness of the ineffective dielectric layer is substantially the same as the thickness of the effective dielectric layer 133. Specifically, the thickness of the ineffective dielectric layer preferably is more than about 0.5 times and less than about 2 times the thickness of the effective dielectric layer 133, for example. The ineffective dielectric layer and the effective dielectric layer 133 are made of ceramic green sheets of the same thickness.

The conductive layers 140 include a conductive layer 140 that is sandwiched between the effective dielectric layer 133 and the ineffective dielectric layer. Specifically, a first conductive layer 141 and a second conductive layer 142, which include another first conductive layer 141 or another second conductive layer 142 located therebetween, are stacked together with dielectric layers 130 therebetween.

In the multilayer body 110, a portion between the first and second outer layer portions 131 and 132 is referred to as an intermediate portion. In the present preferred embodiment, the intermediate portion includes one first ineffective dielectric layer 134 and two second ineffective dielectric layers 135.

The first ineffective dielectric layer 134 is positioned outermost in the intermediate portion near the second main surface 112. One of the two second ineffective dielectric layers 135 is positioned outermost in the intermediate portion near the first main surface 111. That is, each of the two conductive layers 140 at the opposite ends in the stacking direction T of the multilayer body 110 adjoins an ineffective dielectric layer. Specifically, an outermost conductive layer 348, which is closest to the first main surface 111 in the stacking direction T of the multilayer body 110, adjoins the second ineffective dielectric layer 135, whereas an outermost conductive layer 349, which is closest to the second main surface 112 in the stacking direction T of the multilayer body 110, adjoins the first ineffective dielectric layer 134.

The other one of the two second ineffective dielectric layers 135 is, assuming that the region between the two conductive layers 140 at the opposite ends in the stacking direction T of the multilayer body 110 is divided equally into three regions, positioned in the middle one of the three regions in closest proximity to the center of the intermediate portion. That is, a conductive layer 140 in the middle one of the three regions, into which the region between the two conductive layers 140 at the opposite ends in the stacking direction T of the multilayer body 110 is equally divided, adjoins an ineffective dielectric layer.

Note, however, that the arrangement of ineffective dielectric layers is not limited to that described above, provided that an ineffective dielectric layer adjoins at least one of the outermost conductive layers 349 and 348 which are outermost in the stacking direction T of the multilayer body 110.

As shown in FIG. 17, the amount of convexity of each of the two conductive layers 140 at the opposite ends in the stacking direction T of the multilayer body 110 is larger than the thickness of the ineffective dielectric layer adjoining this conductive layer 140 in a widthwise cross section of the multilayer body 110. Specifically, the amount of convexity $B_1$ of the outermost conductive layer 348, which is closest to the first main surface 111 in the stacking direction T of the multilayer body 110, is larger than the thickness of the second ineffective dielectric layer 135 adjoining the outermost conductive layer 348. The amount of convexity $B_2$ of the outermost conductive layer 349, which is closest to the second main surface 112 in the stacking direction T of the multilayer body 110, is larger than the thickness of the first ineffective dielectric layer 134 adjoining the outermost conductive layer 349.

In the multilayer capacitor 300 of the present preferred embodiment, the outermost conductive layers 348 and 349 protect inner conductive layers 140. In addition, since the number of conductive layers 140 is large, the difference between a pressure applied to the region in which the conductive patterns for conductive layers 140 are present and a pressure applied to the region in which no conductive patterns for conductive layers 140 are present becomes large. This makes it possible to flatten out the conductive patterns for conductive layers 140 to a larger extent in the pressing process.

In the method for producing the multilayer capacitor of Preferred Embodiment 3 of the present invention, a stack of mother sheets is pressure-bonded in the following manner.

Figure 18:
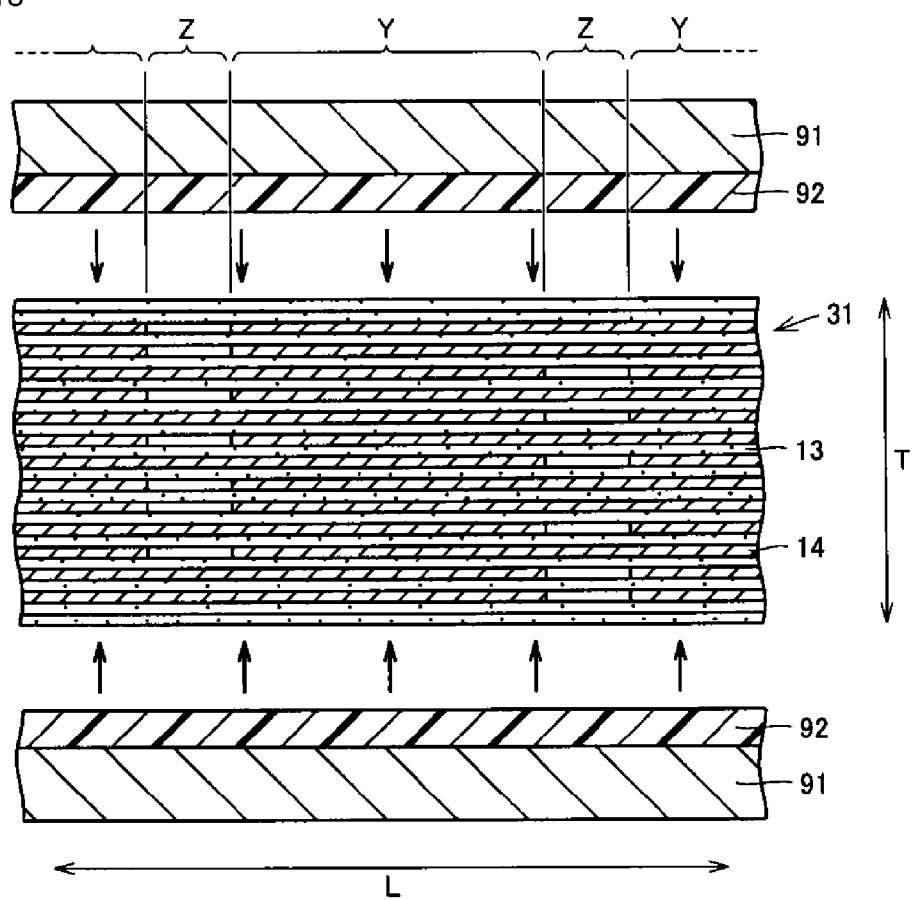
FIG. 18 is a cross-sectional view of a stack of mother sheets, which is not pressed yet, of the multilayer capacitor of Preferred Embodiment 3 of the present invention in the lengthwise direction L of the multilayer capacitor.
Figure 19:
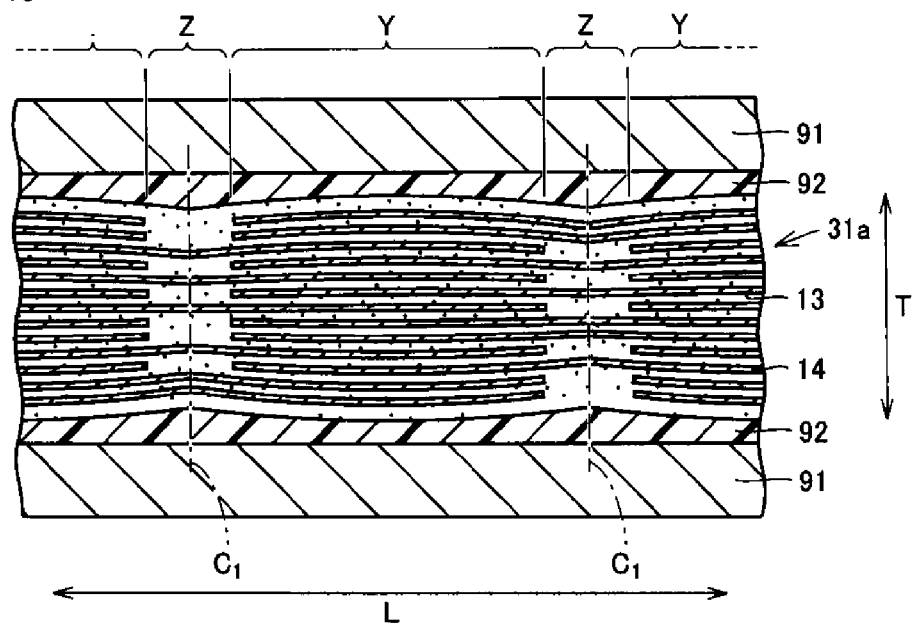
FIG. 19 is a cross-sectional view of the pressed stack of mother sheets of the multilayer capacitor of Preferred Embodiment 3 of the present invention in the lengthwise direction L of the multilayer capacitor.

FIG. 18 is a cross-sectional view of a stack of mother sheets, which is not pressed yet, of the multilayer capacitor of Preferred Embodiment 3 of the present invention in the lengthwise direction L of the multilayer capacitor. FIG. 19 is a cross-sectional view of the pressed stack of mother sheets (i.e., mother multilayer body) of the multilayer capacitor of Preferred Embodiment 3 of the present invention in the lengthwise direction L of the multilayer capacitor. It should be noted that the cross-sections in the widthwise direction W of the multilayer capacitor are the same as those of the stack of mother sheets and the mother multilayer body of Preferred Embodiment 1, and therefore are not described here.

As shown in FIGS. 18 and 19, a stack of mother sheets 31 includes regions Y and regions Z arranged in an alternating manner in the lengthwise direction L. The regions Y have a lot of conductive patterns 14 and the regions Z only have a relatively small number of conductive patterns 14.

Assume that, in one of multilayer bodies which are to be cut from a mother multilayer body 31*a* and which are adjacent to each other in their lengthwise direction, a ceramic green sheet having a conductive pattern disposed in the first arrangement (this conductive pattern corresponds to a first conductive layer 141) is referred to as a pattern-A sheet and a ceramic green sheet having a conductive pattern disposed in the second arrangement (this conductive pattern corresponds to a second conductive layer 142) is referred to as a pattern-B sheet. When the pattern-A sheets are stacked together, the ceramic green sheet between the conductive patterns defines and functions as a first ineffective dielectric layer 134. When the pattern-B sheets are stacked together, the ceramic green sheet between the conductive patterns defines and functions as a second ineffective dielectric layer 135.

That is, regarding the ceramic green sheets having conductive patterns thereon, preparing the pattern-A and pattern-B sheets makes it possible to provide the effective dielectric layer 133 and the first and second ineffective dielectric layers 134 and 135. This makes it possible to readily and effectively produce a mother multilayer body. It should be noted that the pattern-A sheet and pattern-B sheet may be the same ceramic green sheets having identical conductive patterns, which are displaced from each other when stacked together. That is, the mother multilayer body may be produced from ceramic green sheets having identical conductive patterns.

In the present preferred embodiment, at least one pair of conductive layers adjacent to each other with any one of the dielectric layers 130 therebetween are both in the first arrangement or both in the second arrangement. The at least one pair of conductive layers includes at least one of the two conductive layers outermost in the stacking direction T of the multilayer body 110.

Specifically, an ineffective dielectric layer is provided so that at least one of two conductive layers 140 at the opposite ends in the stacking direction T of the multilayer body 110 adjoins this ineffective dielectric layer. In this case, the ineffective dielectric layer at one of the opposite ends in the stacking direction T of the multilayer body 110 serves to protect effective dielectric layers inside the intermediate portion. This makes it possible to provide a highly moisture-resistant and more reliable multilayer capacitor 100.

In the present preferred embodiment, another ineffective dielectric layer is provided so that a conductive layer 140 in the middle in the stacking direction T of the multilayer body 110 adjoins this ineffective dielectric layer. In this arrangement, the dielectric layer in the middle of the multilayer body 110, which is most likely to become thin when mother sheets are pressure-bonded, is ineffective. Even if the ineffective dielectric layer becomes thin and insulation resistance decreases, this does not cause a short circuit. Therefore, it is possible to provide a more reliable multilayer capacitor 300.

In the present preferred embodiment, it is also possible to produce a small-sized, large-capacitance multilayer capacitor that is highly moisture-resistant and less prone to layer separation.

The following describes a multilayer capacitor and a method for producing the multilayer capacitor of Preferred Embodiment 4 of the present invention. It should be noted that, since the multilayer capacitor and the method for producing the multilayer capacitor of the present preferred embodiment are different from the multilayer capacitor and the method for producing the multilayer capacitor of Preferred Embodiment 3 only in a way in which the layers of the multilayer body are stacked, the other constituents are not described here.

Preferred Embodiment 4

Figure 20:
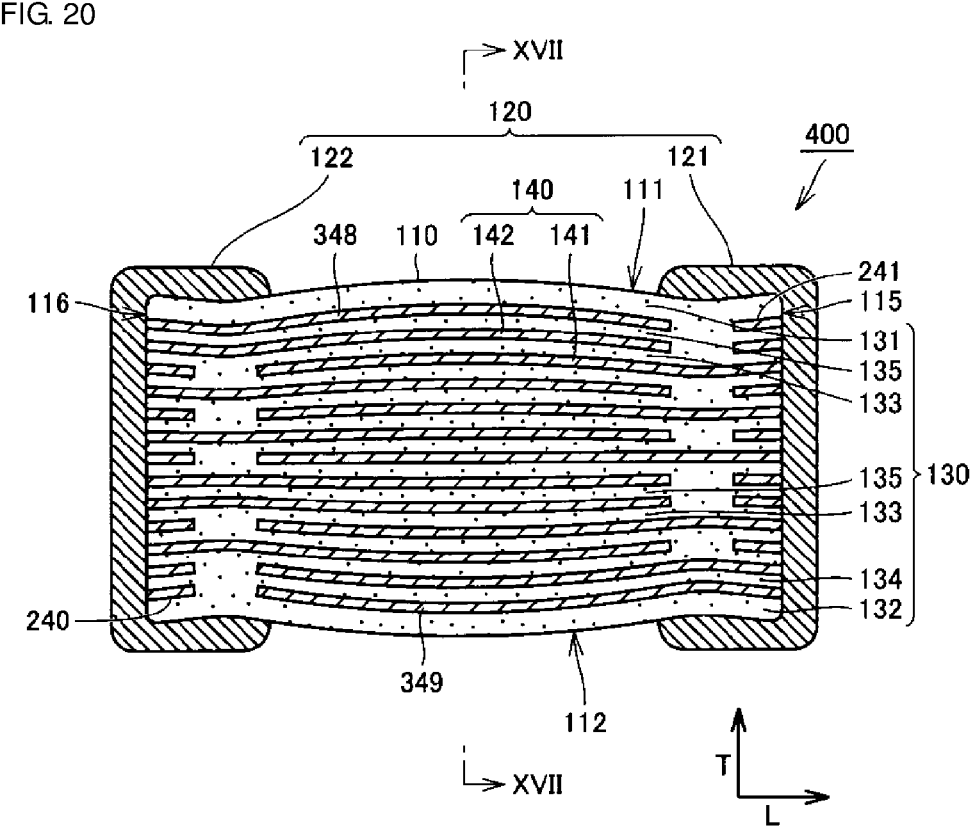
FIG. 20 is a cross-sectional view showing a configuration of a multilayer capacitor of Preferred Embodiment 4 of the present invention.

FIG. 20 is a cross-sectional view showing a configuration of a multilayer capacitor of Preferred Embodiment of the present invention. The cross-sectional view of the multilayer capacitor in FIG. 20 is taken along the same line as FIG. 2. A cross section taken along line XVII-XVII in FIG. 20 of the multilayer capacitor looks the same as that shown in FIG. 17.

As shown in FIG. 20, a multilayer capacitor 400 of Preferred Embodiment 4 of the present invention includes third conductive layers 240 that are connected to a second outer electrode 122 and that are positioned near but separate from end portions, which are closer to a second end surface 116, of first conductive layers 141. The multilayer capacitor 400 further includes fourth conductive layers 241 that are connected to a first outer electrode 121 and that are positioned near but separate from end portions, which are closer to a first end surface 115, of second conductive layers 142.

The multilayer capacitor 400 of the present preferred embodiment achieves the advantages of both the multilayer capacitor 200 of Preferred Embodiment 2 and the multilayer capacitor 300 of Preferred Embodiment 3.

In the method for producing the multilayer capacitor of Preferred Embodiment 4 of the present invention, a stack of mother sheets is pressure-bonded in the following manner.

Figure 21:
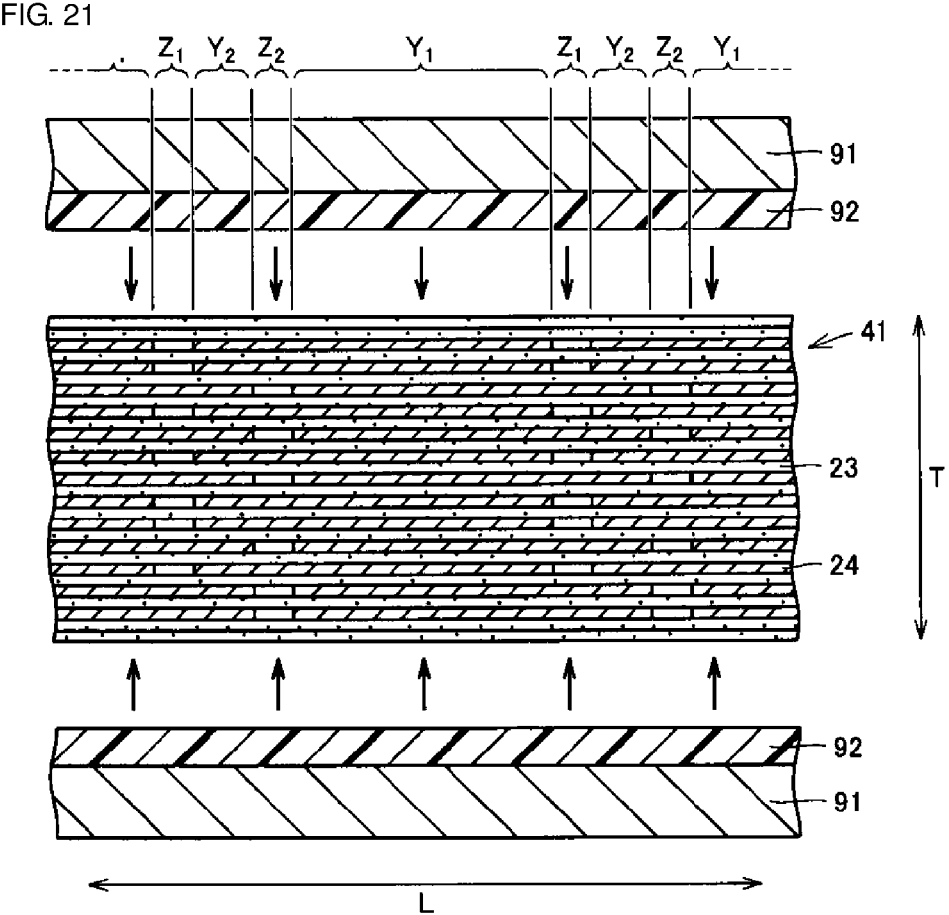
FIG. 21 is a cross-sectional view of a stack of mother sheets, which is not pressed yet, of the multilayer capacitor of Preferred Embodiment 4 of the present invention in the lengthwise direction L of the multilayer capacitor.
Figure 22:
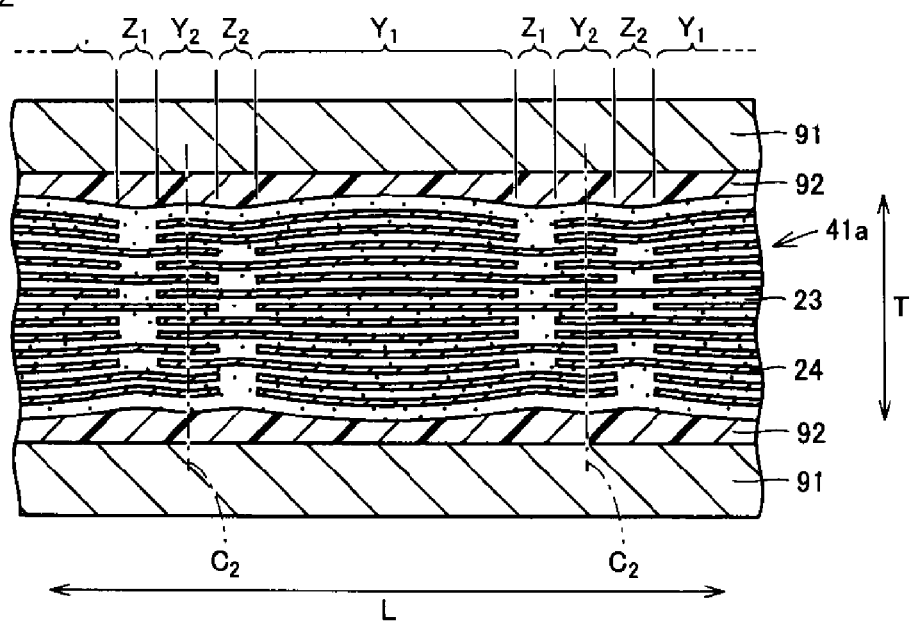
FIG. 22 is a cross-sectional view of the pressed stack of mother sheets of the multilayer capacitor of Preferred Embodiment 4 of the present invention in the lengthwise direction L of the multilayer capacitor.

FIG. 21 is a cross-sectional view of a stack of mother sheets, which is not pressed yet, of the multilayer capacitor of Preferred Embodiment 4 of the present invention in the lengthwise direction L of the multilayer capacitor. FIG. 22 is a cross-sectional view of the pressed stack of mother sheets (i.e., mother multilayer body) of the multilayer capacitor of Preferred Embodiment 4 of the present invention in the lengthwise direction L of the multilayer capacitor. It should be noted that the cross-sections in the widthwise direction W of the multilayer capacitor are the same as those of the stack of mother sheets and the mother multilayer body of Preferred Embodiment 1, and therefore are not described here.

As shown in FIG. 21, a stack of mother sheets 41 includes regions $Y_1$, $Y_2$, $Z_1$, and $Z_2$ repeatedly arranged in the order of $Y_1$, $Z_1$, $Y_2$, and $Z_2$ in the lengthwise direction L. The regions $Y_1$ and $Y_2$ have a lot of conductive patterns 24, and the regions $Z_1$ and $Z_2$ have only a relatively small number of conductive patterns 24.

As shown in FIG. 21, the stack of mother sheets 41 is pressed in the stacking direction T and pressure-bonded with the use of a pair of flat dies 91 including rubber portions 92 on their work surfaces by, for example, isostatic pressing. In the stack of mother sheets 41, the number of layers is larger in the regions $Y_1$ and $Y_2$ than in the regions $Z_1$ and $Z_2$. Therefore, the rubber portions 92 pressed against the stack of mother sheets 41 deform and flow from the regions $Y_1$ and $Y_2$ into the regions Z1 and Z2 and become convex inward as shown in FIG. 22, thus pressure-bonding, like drawing, the mother sheets in the regions $Z_1$ and $Z_2$ of the stack of mother sheets. This causes the mother sheets to strongly adhere to each other. In this way, a mother multilayer body 41a is formed.

Next, the mother multilayer body is cut (step S6). Specifically, the mother multilayer body is cut with a hand cutter or a dicing machine along lines $C_2$ in the regions $Y_2$ into a plurality of soft multilayer bodies substantially in the shape of a cuboid.

The method for producing the multilayer capacitor of the present preferred embodiment also provides a small-sized, large-capacitance multilayer capacitor that is highly moisture-resistant and less prone to layer separation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for producing a multilayer capacitor including a multilayer body that includes conductive layers and dielectric layers arranged on each other in an alternating manner and that has external dimensions in which each side is 0.3 mm or smaller when viewed from a stacking direction of the multilayer body, and first and second outer electrodes disposed on a surface of the multilayer body, the method comprising: a) forming the multilayer body by stacking the conductive layers and the dielectric layers alternately, each of the conductive layers being located in a first arrangement or a second arrangement such that the conductive layers are located in the first arrangement and the second arrangement different from the first arrangement when viewed from the stacking direction; b) stretching the conductive layers in directions perpendicular or substantially perpendicular to the stacking direction by pressing the multilayer body; c) bending at least one of the conductive layers by pressing the multilayer body so that the at least one of the conductive layers is convex in the stacking direction; and d) forming the first and second outer electrodes on the surface of the multilayer body so that the first outer electrode is connected to ones of the conductive layers which are in the first arrangement and the second outer electrode is connected to ones of the conductive layers which are in the second arrangement.

2. The method according to claim 1, wherein each of the conductive layers is tapered in thickness from a center to an edge.

3. The method according to claim 1, wherein each of the conductive layers contains at least one of barium titanate and silicon.

4. The method according to claim 1, wherein step a) includes placing at least one pair of the conductive layers, which are adjacent to each other with one of the dielectric layers interposed therebetween, both in the first arrangement or both in the second arrangement.

5. The method according to claim 4, wherein the at least one pair of the conductive layers includes at least one of two of the conductive layers which are located outermost in the stacking direction.

6. The method according to claim 1, wherein
the at least one of the conductive layers that is bent so as to be convex in the stacking direction is formed to include a plurality of penetrating portions which extend in the stacking direction;
regions A, B, C, and D are, in a cross section perpendicular or substantially perpendicular to the lengthwise direction of the multilayer body, four regions into which the bent conductive layer is equally divided so that the four regions are arranged in order in a widthwise direction of the multilayer body;
an angle of inclination of the bent conductive layer is larger in the region A than in the region B and larger in the region D than in the region C; and
a sum of minimum diameters of the penetrating portions is larger in the region A than in the region B and larger in the region D than in the region C.

7. The method according to claim 6, wherein at least one of the penetrating portions contains filler in each of the regions A and D.

8. The method according to claim 6, wherein the filler contains a dielectric material which constitutes the dielectric layers.

9. The method according to claim 6, wherein the filler contains silicon.

10. The method according to claim 1, wherein each width of the conductive layers is not more than 80% of the width of the multilayer body; and a maximum difference between the width of the multilayer body and each width of the conductive layers is less than 0.07 mm.

11. The method according to claim 1, wherein
at least one of the dielectric layers is an ineffective dielectric layer sandwiched between two of the conductive layers which are both in the first arrangement or both in the second arrangement; and at least one of the dielectric layers is an effective dielectric layer sandwiched between two of the conductive layers which are in the first and second arrangements, respectively.

12. The method according to claim 11, wherein the ineffective dielectric layer adjoins at least one of two of the conductive layers which are located outermost in the stacking direction.

13. The method according to claim 1, wherein an amount of convexity of the bent conductive layer in the cross section perpendicular or substantially perpendicular to the lengthwise direction of the multilayer body is larger than a thickness of one of the dielectric layers which adjoins the bent conductive layer.

14. A multilayer capacitor comprising: a multilayer body that includes conductive layers and dielectric layers arranged on each other in an alternating manner and that has external dimensions in which each side is 0.3 mm or smaller when viewed from a stacking direction of the multilayer body; and first and second outer electrodes that are disposed on a surface of the multilayer body and that are spaced apart from each other in a lengthwise direction of the multilayer body; wherein each of the conductive layers is disposed in a first arrangement or a second arrangement such that the conductive layers are located in the first arrangement and the second arrangement different from the first arrangement when viewed from the stacking direction; the first outer electrode is connected to ones of the conductive layers which are in the first arrangement; the second outer electrode is connected to ones of the conductive layers which are in the second arrangement; at least one of the conductive layers which is located outermost in the stacking direction is bent so as to be convex in the stacking direction and including a plurality of penetrating portions which extend in the stacking direction; regions A, B, C, and D are, in a cross section perpendicular or substantially perpendicular to the lengthwise direction of the multilayer body, four regions into which the bent conductive layer is equally divided so that the four regions are arranged in order in a widthwise direction of the multilayer body; an angle of inclination of the bent conductive layer is larger in the region A than in the region B and larger in the region D than in the region C; and a sum of minimum diameters of the penetrating portions is larger in the region A than in the region B and larger in the region D than in the region C.

15. The multilayer capacitor according to claim 14, wherein each width of the conductive layers is not more than 80% of the width of the multilayer body; and a maximum difference between the width of the multilayer body and each width of the conductive layers is less than 0.07 mm.

16. The multilayer capacitor according to claim 14, wherein
at least one of the dielectric layers is an ineffective dielectric layer sandwiched between two of the conductive layers which are both in the first arrangement or both in the second arrangement; and
at least one of the dielectric layers is an effective dielectric layer sandwiched between two of the conductive layers which are in the first and second arrangements, respectively.

17. The multilayer capacitor according to claim 14, wherein the ineffective dielectric layer adjoins at least one of two of the conductive layers which are located outermost in the stacking direction.

18. The multilayer capacitor according to claim 14, wherein an amount of convexity of the bent conductive layer in the cross section perpendicular or substantially perpendicular to the lengthwise direction of the multilayer body is larger than a thickness of one of the dielectric layers which adjoins the bent conductive layer.

19. The multilayer capacitor according to claim 14, wherein at least one of the penetrating portions contains filler in each of the regions A and D.

20. The multilayer capacitor according to claim 19, wherein the filler contains a dielectric material which constitutes the dielectric layers.

21. The multilayer capacitor according to claim 19, wherein the filler contains silicon.

* * * * *